(12) United States Patent
Wu et al.

(10) Patent No.: US 12,175,384 B2
(45) Date of Patent: Dec. 24, 2024

(54) NEURAL-SYMBOLIC ACTION TRANSFORMERS FOR VIDEO QUESTION ANSWERING

(71) Applicant: International Business Machines Corporation, Armonk, NY (US)

(72) Inventors: Bo Wu, Cambridge, MA (US); Chuang Gan, Cambridge, MA (US); Dakuo Wang, Cambridge, MA (US); Zhenfang Chen, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 17/381,408

(22) Filed: Jul. 21, 2021

(65) Prior Publication Data

US 2023/0027713 A1    Jan. 26, 2023

(51) Int. Cl.

| G06F 17/00 | (2019.01) |
|---|---|
| G06F 40/205 | (2020.01) |
| G06F 40/284 | (2020.01) |
| G06N 5/02 | (2023.01) |
| G06N 5/04 | (2023.01) |
| G06N 20/20 | (2019.01) |
| G06V 20/40 | (2022.01) |

(52) U.S. Cl.
CPC ............ *G06N 5/04* (2013.01); *G06F 40/205* (2020.01); *G06F 40/284* (2020.01); *G06N 5/02* (2013.01); *G06N 20/20* (2019.01); *G06V 20/49* (2022.01)

(58) Field of Classification Search
CPC . G06N 5/02; G06N 5/04; G06N 20/20; G06F 40/205; G06F 40/284; G06V 20/49

USPC ............................................................ 704/9
See application file for complete search history.

(56) References Cited

U.S. PATENT DOCUMENTS

| 10,832,591 B2 | 11/2020 | Byron et al. | |
|---|---|---|---|
| 11,024,306 B2 | 6/2021 | Bhaya et al. | |
| 2019/0149489 A1* | 5/2019 | Akbulut ................. | G06N 5/022 709/206 |
| 2021/0118442 A1* | 4/2021 | Poddar ................... | G06N 20/00 |

(Continued)

OTHER PUBLICATIONS

"Visual Question Answering", VizWiz, accessed online Aug. 19, 2021, 4 pages.

(Continued)

*Primary Examiner* — Paul C McCord
(74) *Attorney, Agent, or Firm* — Stephen J. Walder, Jr.; Caleb Wilkes

(57) ABSTRACT

Mechanisms are provided for performing artificial intelligence-based video question answering. A video parser parses an input video data sequence to generate situation data structure(s), each situation data structure comprising data elements corresponding to entities, and first relationships between entities, identified by the video parser as present in images of the input video data sequence. First machine learning computer model(s) operate on the situation data structure(s) to predict second relationship(s) between the situation data structure(s). Second machine learning computer model(s) execute on a received input question to predict an executable program to execute to answer the received question. The program is executed on the situation data structure(s) and predicted second relationship(s). An answer to the question is output based on results of executing the program.

18 Claims, 6 Drawing Sheets

(56) References Cited

U.S. PATENT DOCUMENTS

| | | | |
|---|---|---|---|
| 2021/0248375 A1* | 8/2021 | Geng | G06F 16/9035 |
| 2022/0121939 A1* | 4/2022 | Evans | G06N 20/00 |
| 2022/0147838 A1* | 5/2022 | Gu | G06V 20/00 |

OTHER PUBLICATIONS

Antol, Stanislaw et al., "VQA: Visual Question Answering", ICVV International Conference on Computer Vision, pp. 2425-2433, May 2015.

Bahdanau, Dzmitry et al., "Neural Machine Translation by Jointly Learning to Align and Translate", ICLR, arXiv preprint arXiv: 1409.0473v1 [cs.CL], pp. 1-15, Sep. 1, 2014.

Bloch, M., "Situated learning: Legitimate peripheral participation", Man, 29(2):487-489, Jun. 1994, 3 pages.

Brown, John S. et al., "Situated Cognition and the Culture of Learning", Institute for Inquiry, Educational Researcher, vol. 18 N1 pp. 32-42, Jan.-Feb. 1989.

Clancey, William J., "Situated Cognition: Stepping out of Representational Flatland", Institute for Research on Learning, AI Communications, The European Journal on Artificial Intelligence 4(⅔), pp. 109-112, Jan. 1, 1991.

Fang, Hau-Shu et al., "RMPE: Regional Multi-Person Pose Estimation", 2017 IEEE International Conference on Computer Vision (ICCV), pp. 2334-2343, Oct. 22-29, 2017.

Girdhar, Rohit et al., "Cater: A Diagnostic Dataset for Compositional Actions & TEmporal Reasoning", Eighth International Conference on Learning Representations, pp. 1-16, Apr. 26-May 1, 2020.

Goyal, Yash et al., "Making the V in VQA Matter: Elevating the Role of Image Understanding in Visual Question Answering", Proceedings of the IEEE Conference on Computer Vision and Pattern Recognition, pp. 6904-6913, Jul. 21-26, 2017.

Hochreiter, Sepp et al., "Long Short-Term Memory", Massachusetts Institute of Technology, Neural Computation, vol. 9 pp. 1735-1780, published Feb. 1997.

Hu, Ronghang et al., "Language-Conditioned Graph Networks for Relational Reasoning", International Conference on Computer Vision, pp. 10294-10303, Oct. 27-Nov. 2, 2019.

Hudson, Drew R et al., "GQA: A New Dataset for Real-World Visual Reasoning and Compositional Question Answering", Conference on Computer Vision and Pattern Recognition, pp. 6700-6709, Jun. 16-20, 2019.

Jang, Yunseok et al., "TGIF-QA: Toward Spatio-Temporal Reasoning in Visual Question Answering", Proceedings of the IEEE Conference on Computer Vision and Pattern Recognition, pp. 2758-2766, Jul. 21-26, 2017.

Ji, Jingwei et al., "Action Genome: Actions as Compositions of Spatio-temporal Scene Graphs", IEEE Conference on Computer Vision and Pattern Recognition, pp. 10236-10247, Jun. 14-19, 2020.

Johnson, Justin et al., "Clevr: A Diagnostic Dataset for Compositional Language and Elementary Visual Reasoning", Proceedings of the IEEE Conference on Computer Vision and Pattern Recognition, pp. 2901-2910, Jul. 21-26, 2017.

Kingma, Diederik P. et al., "Adam: A Method for Stochastic Optimization", ICLR, arXiv preprint arXiv: 1412.6980v1 [cs.LG], pp. 1-9, Dec. 22, 2014.

Kondratyuk, Dan et al., "MoViNets: Mobile Video Networks for Efficient Video Recognition", IEEE Conference on Computer Vision and Pattern Recognition, pp. 16020-16030, Jun. 19-25, 2021.

Krishna, Ranjay et al., "Visual Genome: Connecting Language and Vision Using Crowdsourced Dense Image Annotations", International Journal of Computer Vision, vol. 123 Issue 1, pp. 32-73, Published Online Feb. 6, 2017, Published May 2017.

Lakemeyer, Gerhard, "The Situation Calculus: A Case for Modal Logic", Journal of Logic, Language and Information, vol. 19, No. 4, pp. 431-450, Published Online Jan. 10, 2010, Issue Published Oct. 2010.

Le, Thao M. et al., "Hierarchical Conditional Relation Networks for Video Question Answering", IEEE Conference on Computer Vision and Pattern Recognition, pp. 9972-9981, Jun. 14-19, 2020.

Lei, Jie et al., "TVQA: Localized, Compositional Video Question Answering", Proceedings of the 2018 Conference on Empirical Methods in Natural Language Processing (EMNLP), pp. 1369-1379, Oct. 31-Nov. 4, 2018.

Lei, Jie et al., "TVQA+: Spatio-Temporal Grounding for Video Question Answering", arXiv: 1904.11574v1 [cs.CV], pp. 1-13, Apr. 25, 2019.

Li, Liunian H et al., "VisualBERT: A Simple and Performant Baseline for Vision and Language", arXiv: 1908.03557v1 [cs.CV], pp. 1-14, Aug. 9, 2019.

Lin, Tsung-Yi et al., "Microsoft COCO: Common Objects in Context", 13th European Conference, Proceedings, Part IV, pp. 1-16, Sep. 6-12, 2014.

McCarthy, John, "Situations, Actions, and Causal Laws", Stanford University Department of Computer Science/National Technical Information Service (NTIS), pp. 1-14, Jul. 3, 1963.

Mun, Jonghwan et al., "MarioQA: Answering Questions by Watching Gameplay Videos", International Conference on Computer Vision (ICCV), pp. 2867-2875, Oct. 22-29, 2017.

Pennington, Jeffrey et al., "GloVe: Global Vectors for Word Representation", Empirical Methods in Natural Language Processing (EMNLP), pp. 1-12, Oct. 25-29, 2014.

Prendinger, Helmut et al., "Reasoning about Action and Change: A Dynamic Logic Approach", Journal of Logic, Language, and Information, vol. 5, No. 2, pp. 209-245, In Final Form Apr. 10, 1996.

Reiter, Raymond, "The Frame Problem in the Situation Calculus: A Simple Solution (Sometimes) and a Completeness Result for Goal Regression", Department of Computer Science, University of Toronto, Canada and The Canadian Institute for Advanced Research, Artificial Intelligence and Mathematical Theory of Computation: Papers in Honor of John McCarthy, 1st Edition, pp. 359-380, Sep. 28, 1991.

Sigurdsson, Gunnar A. et al., "What Actions are Needed for Understanding Human Actions in Videos?", 2017 IEEE International Conference on Computer Vision (ICCV), pp. 2137-2146, Oct. 22-29, 2017.

Tang, Kaihua et al., "Unbiased Scene Graph Generation from Biased Training", IEEE Conference on Computer Vision and Pattern Recognition, pp. 3716-3725, Jun. 14-19, 2020.

Tapaswi, Makarand et al., "MovieQA: Understanding Stories in Movies through Question-Answering", IEEE Conference on Computer Vision and Pattern Recognition (CVPR), pp. 4631-4640, Jun. 26-Jul. 1, 2016.

Vaswani, Ashish et al., "Attention Is All You Need", 31st Conference on Neural Information Processing Systems (NeurIPS), pp. 1-11, Dec. 4-9, 2017.

Wang, Xiaolong et al., "Actions ~ Transformations", IEEE Conference on Computer Vision and Pattern Recognition (CVPR), pp. 2658-2667, Jun. 26-Jul. 1, 2016.

Winslett, Marianne, "Reasoning About Action Using a Possible Models Approach", Department of Computer Science, University of Illinois at Urbana-Champaign, Proceedings of the Seventh National Conference on Artificial Intelligence (AAAI-88), pp. 89-93, Aug. 21-26, 1988.

Xie, Saining, "Aggregated Residual Transformations for Deep Neural Networks", arXiv:1611.05431v1 [cs.CV], pp. 1-10, Nov. 16, 2016.

Yang, Guangyu R. et al., "A Dataset and Architecture for Visual Reasoning with a Working Memory", European Conference on Computer Vision (ECCV), pp. 1-18, Sep. 8-14, 2018.

Yi, Kexin et al., "Clevrer: Collision Events for Video Representation and Reasoning", Eighth International Conference on Learning Representations, pp. 1-19, Apr. 26-May 1, 2020.

Yi, Kexin et al., "Neural-Symbolic VQA: Disentangling Reasoning from Vision and Language Understanding", arXiv:1810.02338v1 [cs.AI], pp. 1-12, Oct. 4, 2018.

Zellers, Rowan et al., "From Recognition to Cognition: Visual Commonsense Reasoning", In Proceedings of the IEEE/CVF Conference on Computer Vision and Pattern Recognition, pp. 6720-6731, Jun. 15-20, 2019.

(56) References Cited

OTHER PUBLICATIONS

Zhang, Ji et al., "Graphical Contrastive Losses for Scene Graph Parsing", In Proceedings of the IEEE/CVF Conference on Computer Vision and Pattern Recognition, pp. 11535-11543, Jun. 15-20, 2019.

Zhu, Yuke et al., "Visual7W: Grounded Question Answering in Images", In Proceedings of 2016 IEEE Conference on Computer Vision and Pattern Recognition, pp. 4995-5004, Jun. 26-Jul. 1, 2016.

Anonymous, "An Unsupervised Neuro-Symbolic Approach for Cell Retrieval and QA Over Tables", IP.com, Prior Art Database Technical Disclosure, IPCOM000265080D, Feb. 23, 2021, 5 pages.

Anonymous, "Method to Derive Video Course Assessment Relevancy Scoring", IP.com, Prior Art Database Technical Disclosure, IPCOM000264283D, Nov. 30, 2020, 7 pages.

Anonymous, "System and associated methods for providing responses (answers) in the right set of modality based on the question asker, other individuals associated with the question (relationship) based on collective need", IP.com, Prior Art Database Technical Disclosure, IPCOM000262510D, Jun. 8, 2020, 5 pages.

Girdhar, Rohit et al., "Video Action Transformer Network", IEEE/CVF Computer Vision and Pattern Recognition (CVPR 2019), Jun. 16-20, 2019, 10 pages.

Saqur, Raeid et al., "Multimodal Graph Networks for Compositional Generalization in Visual Question Answering", 34th Conference on Neural Information Processing Systems (NeurIPS 2020), Dec. 6-12, 2020, 12 pages.

Wiegreffe, Sarah, "CS 4803/7643: Deep Learning", Georgia Tech, 2019, 97 pages.

\* cited by examiner

| MODULE TYPE | FUNCTION NAME AND DESCRIPTION | INPUTS | OUTPUTS |
|---|---|---|---|
| INPUT | SITUATIONS<br>Return all situations. | \ | situations |
| ELEMENT | ACTIONS<br>Return all actions in the input situations.<br>OBJS<br>Return all objects in the input situations.<br>RELS<br>Return all relationships in the input situations. | situations<br><br>situations<br><br>situations | objects<br><br>objects<br><br>relationships |
| FILTER | FILTER_ACTIONS_WITH_VERB<br>Select actions from input actions with the input verb.<br>FILTER_ACTIONS_WITH_OBJ<br>Select actions from input actions with the input object.<br>FILTER_AFTER_ACTIONS<br>Select actions happening after input action.<br>FILTER_BEFORE_ACTIONS<br>Select actions happening before input action.<br>FILTER_VERBS_BY_OBJ<br>Select verbs that are compositional with the input object.<br>FILTER_OBJS_BY_VERB<br>Select objects that are compositional with the input verb.<br>FILTER_SITUATIONS_WITH_REL<br>Select situations that contain the input relationship.<br>FILTER_SITUATIONS_WITH_OBJ<br>Select situations that contain the input object. | (actions, verb)<br><br>(actions, object)<br><br>(actions, action)<br><br>(actions, action)<br><br>(verbs, object)<br><br>(objects, verb)<br><br>(situations, relationship)<br><br>(situations, object) | actions<br><br>actions<br><br>actions<br><br>actions<br><br>verbs<br><br>objects<br><br>situations<br><br>situations |
| QUERY | QUERY_VERBS<br>Return verbs in the input actions.<br>QUERY_OBJS<br>Return objects in the input actions.<br>QUERY_ACTIONS<br>Return action classes in the input actions.<br>QUERTY_EARLIEST_ACTION<br>Return the action happening earliest in the input actions.<br>QUERY_LATEST_ACTION<br>Return the action happening latest in the input actions. | actions<br><br>actions<br><br>actions<br><br>actions<br><br>actions | verbs<br><br>objects<br><br>action_classes<br><br>action<br><br>action |
| LOGIC | UNIQUE<br>Return True if the set contains only one element, else return False.<br>EQUAL<br>Return True if two input sets are equal, else return False.<br>INCLUDE<br>Return True if the set2 is included in the set1, else return False.<br>UNION<br>Return the union of the input sets.<br>EXCEPT<br>Return the except of the input sets. | set<br><br>(set1, set2)<br><br>(set1, set2)<br><br>(set1, set2)<br><br>(set1, set2) | bool<br><br>bool<br><br>bool<br><br>set<br><br>set |

*FIG. 4*

| | SITUATION 1 | | | | | | | | SIT. 2 |
|---|---|---|---|---|---|---|---|---|---|
| TOKEN EMB (VECTOR) | ACT_EMB | ACT_EMB | [SEP] | PER_EMB | REL_EMB | OBJ_EMB | [SEP] | PER_EMB | REL_EMB | OBJ_EMB | |
| TYPE EMB | A | A | M | P | R | O | M | P | R | O | ... |
| TRIPLET EMB | 0 | 0 | MAX | 2 | 2 | 1 | MAX | 2 | 2 | 2 | ... |
| HYPER-EDGE EMB | 1 | 1 | 0 | 0 | 0 | 0 | 0 | 0 | 0 | 0 | ... |
| SITUATION EMB | 1 | 1 | 1 | 1 | 1 | 1 | 1 | 1 | 1 | 1 | ... |

INTERACTION QUESTION
Q: Which object was eaten by the person?
A: The sandwich.

Query_Objs(
 Filter_Actions_with_Verb(
  Actions(Situations()), eat
 )
)

SEQUENCE QUESTION
Q: Which object did the person take after they closed the book?
A: The dish.

Query_Objs(
 Filter_Actions_with_Verb(
  Filter_After_Actions(
   Actions(Situations()), Unique(
    Filter_Actions_with_Obj(
     Actions(Situations()
    ), book), close
   )
  )
 ), take)
)

PREDICTION QUESTION
Q: What will the person do next?
A: Close the door.

Query_Actions(
 Filter_After_Actions(
  Actions(Situations())
  Query_Earliest_Action(
   Actions(Situations())
  )
 )
)

FEASIBILITY QUESTION
Q: Which other object is possible to be put down by the person?
A: The clothes.

Except(
 Filter_Objs_by_Verb(
  Objs(Situations()), put
 )
 QueryObjs(
  Query_Earliest_Action(
   Filter_Actions_with_Verb(
    Actions(Situations())
   )
  )
 ), put
)

*FIG. 5*

NEURAL-SYMBOLIC ACTION TRANSFORMERS FOR VIDEO QUESTION ANSWERING

BACKGROUND

The present application relates generally to an improved data processing apparatus and method and more specifically to mechanisms that implement neural-symbolic action transformers to perform video question answering.

As recognized in "Inventing AI Tracing the Diffusion of Artificial Intelligence with U.S. Patents", published by the United States Patent and Trademark Office's Office of the Chief Economist, IP Data Highlights, No. 5, October 2020, artificial intelligence (AI) is increasingly important for modern innovations and has the potential to fundamentally change how people perceive the world around them and live their daily lives. As noted in this publication, such fundamental changes are the essence of technological progress and realizing these changes happens through innovation.

One area where AI is being applied is the area of visual question answering (VQA). The area of VQA involves handling a task of answering open-ended natural language questions about a given image or set of images. While most human beings find it relatively easy to reason about real-world situations represented in images, because of their innate knowledge and understanding of the physical world through experience and human intelligence based reasoning capabilities, the same is not true of computer based AI systems. Such AI systems do not have the innate knowledge, understanding of the physical world, experiences, or reasoning capabilities. Hence, being able to have an AI system that is able to understand the physical world from visual inputs and make logical decisions would be a significant step toward advanced AI.

However, existing work focuses primarily on object recognition without implicit logical reasoning. As a result, existing AI systems do not have models that are able to accurately generate answers to complex questions, such as questions concerning interaction, sequencing, prediction, and feasibility.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system, for performing artificial intelligence-based video question answering. The method comprises parsing, by a video parser of the data processing system, an input video data sequence to generate one or more situation data structures, each situation data structure comprising data elements corresponding to entities, and first relationships between entities, identified by the video parser as present in images of the input video data sequence. The method further comprises executing at least one first machine learning computer model of the data processing system on the one or more situation data structures to predict one or more second relationships between the one or more situation data structures. The method also comprises determining, by at least one second machine learning computer model of the data processing system executing on a received input natural language question, an executable program to execute to answer the received input natural language question. In addition, the method comprises executing, by the data processing system, the determined executable program on the one or more situation data structures and predicted one or more second relationships between the one or more situation data structures. Furthermore, the method comprises outputting, by the data processing system, an answer to the input natural language question based on results of executing the determined executable program. Thus, the mechanisms of the illustrative embodiment provides an artificial intelligence computing system that can perform logical reasoning over an input video data sequence to answer natural language questions.

In some illustrative embodiments, the at least one first machine learning computer model comprises a situation encoder, a machine learning trained dynamics transformer computer model, and a sequence decoder. In some illustrative embodiments, executing the at least one first machine learning computer model comprises performing, by the situation encoder, encoding of the situation data structures to generate a token sequence corresponding to the entities and relationships represented in the one or more situation data structures, and processing, by the machine learning trained dynamics transformer computer model, the token sequence to predict missing or subsequent token sequences and generate a predicted token sequence comprising the predicted missing or subsequent token sequences. Thus, the mechanisms of the illustrative embodiment machine learning computer model mechanisms that are able to learn to predict token sequences based on recognized entities and relationships in an input video data sequence.

In some illustrative embodiments, the at least one first machine learning computer model further comprises a sequence decoder, and wherein the sequence decoder generates the predicted one or more second relationships, based on the predicted token sequence, as one or more predicted hypergraph data structures. In this way, in accordance with at least one illustrative embodiment, machine learning computer model mechanisms can predict actions or relationships between image data sequences in the input video data that represent relationships between situations that may not be explicitly shown in the input video data itself.

In some illustrative embodiments, the at least one second machine learning computer model comprises a language/program parser and program executor. In some illustrative embodiments, determining the executable program comprises processing, by the language/program parser, the input natural language question to predict a plurality of program modules to execute to answer the input natural language question, combining, by a program executor, the plurality of program modules into an executable program that is executed on the one or more predicted hypergraph data structures to generate a final answer to the input natural language question, and outputting, by the data processing system, the final answer to the input natural language question. In this way, at least one illustrative embodiment is able to convert natural language questions into predicted computer executable models that are able to answer those questions based on predicted relationships between situations in the input video data.

In some illustrative embodiments, each hypergraph data structure comprises one or more hyperedges connecting a first situation data structure in the one or more situation data structures, to at least one second situation data structure, wherein the at least one situation data structure is one of the first situation data structure or a different situation data structure in the one or more situation data structures. In some illustrative embodiments, each hyperedge in the one or more hyperedges comprises a predicted action corresponding to at least one first entity in the first situation data structure with at least one second entity in the at least one second entity data structure. In this way, the hypergraph data structures provide predicted actions connecting situations represented by the situation data structures which are then able to be processed by a predicted program to generate answers to an input natural language question.

In some illustrative embodiments, each situation, comprising one or more images of the input video data sequence, has a corresponding situation data structure in the one or more situation data structures. In some illustrative embodiments, the situation data structures are situation graph data structures in which the data elements comprise nodes corresponding to the entities and edges corresponding to the relationships between the entities. In some illustrative embodiments, the input natural language question is a logical reasoning question of either an interaction question type, a sequence question type, a prediction question type, or a feasibility question type. Thus, the mechanisms of the illustrative embodiments are able to answer logical reasoning questions that ask about relationships and actions that are not necessarily explicitly shown in the image data of the input video data itself.

In some illustrative embodiments, a computer program product is provided that comprises a computer readable storage medium having a computer readable program stored therein. The computer readable program, when executed in a data processing system, causes the data processing system to parse, by a video parser of the data processing system, an input video data sequence to generate one or more situation data structures, each situation data structure comprising data elements corresponding to entities, and first relationships between entities, identified by the video parser as present in images of the input video data sequence. The computer readable program further causes the data processing system to execute at least one first machine learning computer model of the data processing system on the one or more situation data structures to predict one or more second relationships between the one or more situation data structures. The computer readable program also causes the data processing system to determine, by at least one second machine learning computer model of the data processing system executing on a received input natural language question, an executable program to execute to answer the received input natural language question, and execute, by the data processing system, the determined executable program on the one or more situation data structures and predicted one or more second relationships between the one or more situation data structures. In addition, the computer readable program further causes the data processing system to output, by the data processing system, an answer to the input natural language question based on results of executing the determined executable program.

In some illustrative embodiments, the at least one first machine learning computer model comprises a situation encoder, a machine learning trained dynamics transformer computer model, and a sequence decoder. In some illustrative embodiments, executing the at least one first machine learning computer model comprises performing, by the situation encoder, encoding of the situation data structures to generate a token sequence corresponding to the entities and relationships represented in the one or more situation data structures, and processing, by the machine learning trained dynamics transformer computer model, the token sequence to predict missing or subsequent token sequences and generate a predicted token sequence comprising the predicted missing or subsequent token sequences.

In some illustrative embodiments, the at least one first machine learning computer model further comprises a sequence decoder, and wherein the sequence decoder generates the predicted one or more second relationships, based on the predicted token sequence, as one or more predicted hypergraph data structures. In some illustrative embodiments, the at least one second machine learning computer model comprises a language/program parser and program executor. In some illustrative embodiments, the computer readable program further causes the data processing system to determine the executable program comprises processing, by the language/program parser, the input natural language question to predict a plurality of program modules to execute to answer the input natural language question, combining, by a program executor, the plurality of program modules into an executable program that is executed on the one or more predicted hypergraph data structures to generate a final answer to the input natural language question, and outputting, by the data processing system, the final answer to the input natural language question.

In some illustrative embodiments, each hypergraph data structure comprises one or more hyperedges connecting a first situation data structure in the one or more situation data structures, to at least one second situation data structure, wherein the at least one situation data structure is one of the first situation data structure or a different situation data structure in the one or more situation data structures. In some illustrative embodiments, each hyperedge in the one or more hyperedges comprises a predicted action corresponding to at least one first entity in the first situation data structure with at least one second entity in the at least one second entity data structure.

In some illustrative embodiments, each situation, comprising one or more images of the input video data sequence, has a corresponding situation data structure in the one or more situation data structures. In some illustrative embodiments, the situation data structures are situation graph data structures in which the data elements comprise nodes corresponding to the entities and edges corresponding to the relationships between the entities. In some illustrative embodiments, the input natural language question is a logical reasoning question of either an interaction question type, a sequence question type, a prediction question type, or a feasibility question type.

In some illustrative embodiments, an apparatus is provided that comprises at least one processor and at least one memory coupled to the at least one processor. The at least one memory comprises instructions which, when executed by the at least one processor, cause the at least one processor to parse, by a video parser of the data processing system, an input video data sequence to generate one or more situation data structures, each situation data structure comprising data elements corresponding to entities, and first relationships between entities, identified by the video parser as present in images of the input video data sequence. The instructions further cause the at least one processor to execute at least one first machine learning computer model of the data processing system on the one or more situation data structures to predict one or more second relationships between the one or more situation data structures. The instructions also cause the at least one processor to determine, by at least one second machine learning computer model of the data processing system executing on a received input natural language question, an executable program to execute to answer the received input natural language question. In addition, the instructions cause the at least one processor to execute, by the data processing system, the determined executable program on the one or more situation data structures and predicted one or more second relationships between the one or more situation data structures. Moreover, the instructions cause the at least one processor to output, by the data processing system, an answer to the input natural language question based on results of executing the determined executable program.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram of the structure of a hypergraph token sequence for representations in SRT encoding in accordance with one illustrative embodiment;

FIG. 4 is an example program module listing for automatic program generation by a program parser in accordance with one illustrative embodiment;

FIG. 5 is an example of automatically generated programs for four example question types in accordance with one illustrative embodiment;

DETAILED DESCRIPTION

Figure 1:
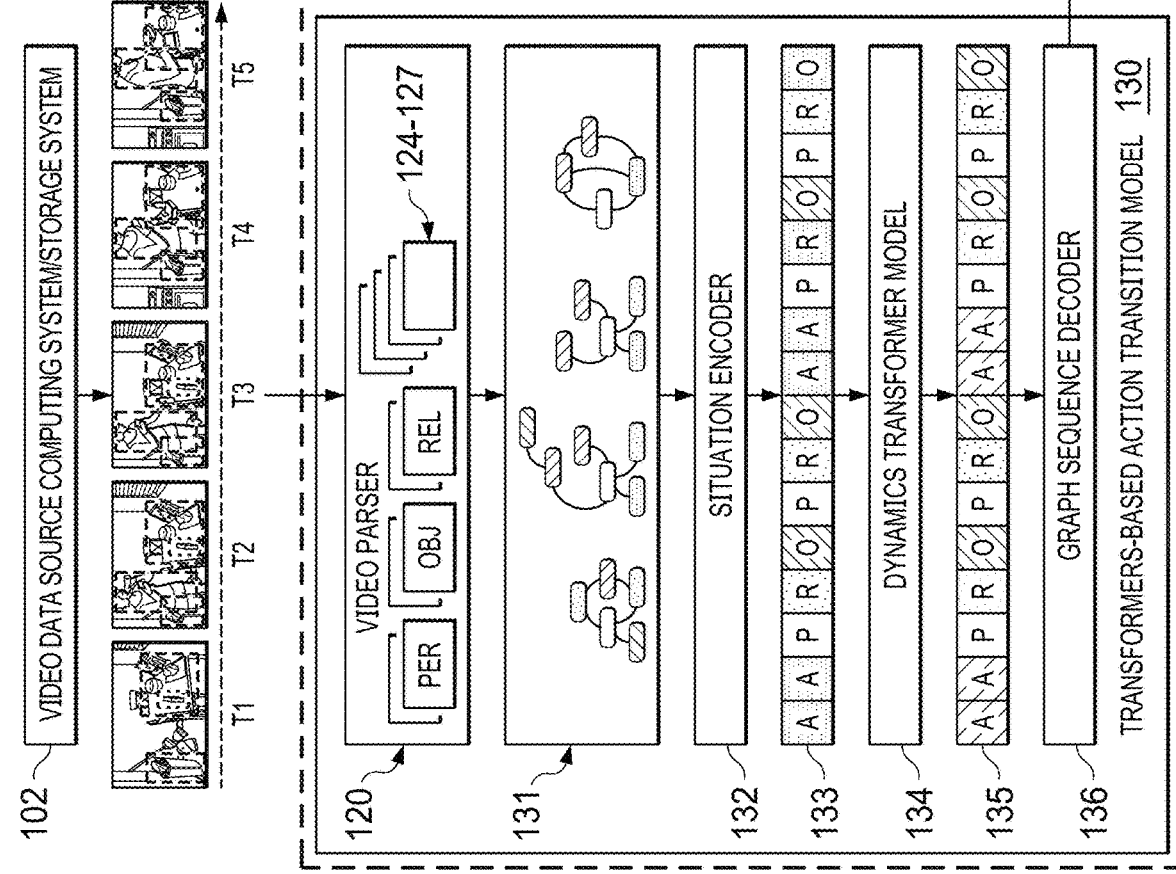
FIG. 1 is a block diagram illustrating the primary operation components of a situated reasoning transformer (SR-transformer) based improved computing tool in accordance with one illustrative embodiment.

As mentioned above, Visual Question Answering (VQA) is an area of modern efforts in artificial intelligence (AI) in which open-ended natural language questions about a given image, or set of images, are answered through an AI computer system, such as a neural network, convolutional neural network (CNN), deep learning neural network (DNN), or the like. To be able to answer such questions given an image, the AI system must be trained to have an understanding of vision, language, as well as some knowledge base from which to generate answers. This is a considerably complex problem which makes the ability of AI systems limited to answering questions about what is specifically represented in the input images and does not allow for any logical reasoning beyond what is explicitly shown in the input images.

For example, given an image of a man and woman, the man wearing a hat and the woman not wearing a hat, current AI systems may be able to answer questions such as "Who is wearing a hat?" or "Who is not wearing a hat?" or "What color is the woman's dress?" or "How many people are in the image?", all of which are questions about what is already represented in the image itself. For example, some efforts have proposed an AI challenge to design algorithms that answer visual questions asked by people who are blind. With such VQA efforts, the AI system is given an image and a question about that image, where the questions are those asking about what is depicted in the image itself, e.g., "Does this foundation have any sunscreen?" (image of an ingredient listing on a bottle), "What is this?" (image of money), "What color is this?" (image of a shirt), "What is this item?" (image of a can of food), "Is it sunny outside?" (image of a house), "What is the oven temperature?" (image of an oven controller), etc.

There is no ability to perform logical reasoning based on the current VQA mechanisms to answer complex questions, such as questions concerning interaction, sequencing, prediction, and feasibility, e.g., "How does the man get the woman's hat?", "How does the man sit on the couch?", "What should the man do to reach the woman?", "Will the woman's hat fall to the ground?", etc. That is, existing VQA artificial intelligence (AI) systems are limited to answering questions about what is explicitly shown in the images, i.e., in-frame contents, and cannot learn relationships from the visual information, which can then be used to apply to new situations to answer complex questions requiring logical reasoning, rather than simply object recognition.

The ability to learn relationships from visual information depicting human interaction with their environment in a computer recognizable manner, so that complex question answering can be performed, has many different applications. For example, such learning can be used to allow AI based systems to learn how to reason for themselves as to how to achieve an objective given a similar physical environment. For example, by observing a human navigating a real-world environment, the AI system can determine how a human being would navigate around obstacles or interact with objects in an environment to achieve a desired result, i.e., sequences of actions and relationships between the human being and objects in the environment, such that predictions of sequences of actions can be made. As one example, a series of images may be presented in which a human being enters a room through a door, walks around a sofa, and then sits on the sofa. Presented with a question of "What should the man do to sit on the sofa?", from observing the images, the AI system could learn relationships between the human being and the objects in the environment, as well as the timing and sequencing of such actions and relationships. Then from these relationships, the AI system could determine that the sequence of entering through the door, walking around the sofa, and then sitting down on the sofa achieves a desired result indicated in the question. Hence, the AI system has learned how a human can achieve the desired result of sitting on the sofa and can apply similar logical reasoning to other situations, such as sitting on a chair, or at a desk, etc., where similar patterns of objects and relationships may exist.

It can be seen how such learning can then be translated to computer initiated robotic commands to cause a robotic system to perform the desired actions within a physical environment to achieve the desired result, e.g., a robotic system sitting on the sofa in this example. For example, desired results can be translated to natural language questions, and answers can be translated to command signals. Thus, for example, if a robotic system is required to traverse a physical environment, the goal may be posed as "Get to the exit", which can then be translated to a natural language question of "How do I get to the exit?," and the resulting sequence generated may be posed as commands for the robotic system to follow. The AI system itself may generate these questions and commands and thereby autonomously learn how to act in given situations and given physical environments. In other words, by combining VQA mechanisms and logical reasoning AI mechanisms, improved AI systems are achieved that can use logical reasoning to autonomously answer complex questions beyond merely recognizing content within images.

Current VQA AI systems are not able to learn relationships and apply them to complex questions to generate logical reasoning based answers to these complex questions. These limitations of existing VQA AI systems are addressed by the mechanisms of the illustrative embodiments by providing an improved AI system and corresponding AI model implementing a neural-symbolic situated action transformer for VQA. The mechanisms of the illustrative embodiments utilize a plurality of AI computer models, i.e., computer executed models implementing artificial intelligence mechanisms, such as transformer based models, neural networks, convolutional neural networks (CNNs), deep learning neural networks (DNNs), Long Short Term Memory (LSTM) based neural networks, or the like, that implement situated reasoning using machine learning and object/relationship detection in input video image sequences. Situated reasoning refers to learning relationships between objects, sequences of relationships, and the like, for specific situations represented in image data, and then using the learned relationships and sequences to reason over new situations, in newly received image data, and make predictions for addressing the new situations to achieve a desired result or generate a desired answer to a provided query.

In one illustrative embodiment, a situated reasoning bidirectional encoder representations from transformers (SR-BERT) AI computer model is provided. A BERT is a transformer based machine learning computer model developed initially for natural language processing that uses word embeddings and bidirectional contexts. A transformer based machine learning computer model is a deep learning model that adopts the mechanism of attention, differentially weighing the significance of each part of the input data. Like RNNs, transformers handle sequential input data, but unlike RNNs, transformers do not necessarily process the data in order. Rather, the attention mechanism provides context for any position in the input sequence. For example, if the input data is a natural language sentence, the transformer does not need to process the beginning of the sentence before the end. Rather, the transformer identifies the context that confers meaning to each word in the sentence. This feature allows for more parallelization than RNNs and reduces training times. Transformer computer models use an attention mechanism without an RNN, processing all tokens at the same time and calculating attention weights between them in successive layers.

With a transformer computer model, an attention layer of the model can access all previous states and weighs them according to a learned measure of relevancy, providing relevant information about far-away tokens. For example, in the natural language processing technology, an attention mechanism of a transformer model can be explained more clearly with a language translation example, where context is essential to assigning the meaning of a word in a sentence. For example, with an English-to-French translation system, the first word of the French output most probably depends heavily on the first few words of the English input. However, in a classic RNN or LSTM computer model, in order to produce the first word of the French output, the model is given only the state vector of the last English word. Theoretically, this vector can encode information about the whole English sentence, giving the model all necessary knowledge. In practice this information is often poorly preserved by the RNN or LSTM computer model. An attention mechanism can be added to address this problem where the decoder is given access to the state vectors of every English input word, not just the last, and can learn attention weights that dictate how much to attend to each English input state vector. When added to RNNs, attention mechanisms increase performance.

In one illustrative embodiment, the SR-BERT AI computer model utilizes a dynamics transformer model that implements the attention mechanisms of a transformer model to draw from the state at any preceding point along a sequence, where this sequence may be a sequence of image frames of input video data. A video parser parses input video data which is comprised of image frames with corresponding timestamp information. Each image frame is parsed to identify the persons, objects, and relationships that are represented in the image data of the image frame. These persons, objects, and relationships are converted to a situation graph data structure having nodes representing the persons and objects, and edges representing the relationships, such that each relationship may be either a person-object relationship or object-object relationship. Hence, each portion of the input video data corresponding to each timestamp has a corresponding situation graph data structure. The timestamp information is maintained for each situation graph data structure such that a sequence of satiation graph data structures is generated.

It should be appreciated that the symbolic visual reasoning performed by the mechanisms of the illustrate embodiments is designed to perform multiple steps of logic instead of single step. Therefore, this symbolic visual reasoning mechanisms need to grasp the multiple steps of reasoning capacity via multiple hops of connections within a graph structure data. The illustrate embodiments adopt the extracted situation graph structured data to explicitly express both identified entities (persons, objects, relationships etc.) and existed connections (e.g., who interacts with which, which relationship is reflect which action, etc.) for the image facts, instead of entities only, so that the reasoning operations can be grounded to the partial connected graph explicitly in the next reasoning operations. Only using the identified entities without partial connections, the mechanisms would not be able to follow up the multiple steps of reasoning going step-by-step.

The situation graph data structures are input to a transformer-based action transition computer model that includes a situation graph encoder, a dynamics transformer model, and a graph sequence decoder. The situation graph encoder encodes the sequence of situation graph data structures into a token sequence according to an encoding schema. During training of the dynamics transformer model, this encoding of the sequence of situation graph data structures may be masked according to one or more mask data structures that identify the portions of the token sequence that the dynamics transformer model is to learn through machine learning processes. For example, particular patterns of actions in the token sequence may be masked so that the dynamics transformer model operates to predict these actions and, through machine learning, learns appropriate attention weightings to apply to generate correct predictions of such actions.

The dynamics transformer model operates on the token sequence output by the situation encoder to generate a predicted token sequence. That is, similar to the masking during training of the dynamics transformer model, during runtime operation of the SR-BERT, the situation graph encoder may have missing tokens in the sequence. The dynamics transformer model predicts these tokens based on its machine learning of the attention weights for the state information for each of the tokens in the input token sequence from the situation encoder. Moreover, the dynamics transformer model may predict a next set of tokens in the predicted token sequence for timestamps not present in the input video data. For example, during testing (different with the masking of training), selected token types may be masked, e.g., masking out action token positions to reserve the positions for the possible appeared actions of each situation frame. Each masked token, e.g., each masked out action token, corresponds to a discrete class, e.g., action class, and its value ranges from values for predefined classes, e.g., predefined action classes, to a "MASK" value (need to be filled in) or "NA" (for no action). Thus, in the prediction stage, the tokens, e.g., action tokens, with "MASK" need to be predicted by the dynamic transformer model.

Thus, the dynamics transformer model predicts a token sequence based on its machine learning training of the attention weights for state information for tokens in an input token sequence. The output of the dynamics transformer model is a predicted token sequence that is then input to a graph sequence decoder. The graph sequence decoder generates predicted hypergraph data structures based on the predicted token sequence, where the predicted portions of the predicted token sequence, i.e., the portions that did not exist in the input token sequence from the situation encoder, may be represented as hyperedges linking situation graphs of one or more of the situation graph data structures to other situation graphs of the same or different ones of the situation graph data structures. The hyperedges represent predicted relationships between the situation graphs of the various situation graph data structures. Each hyperedge in the predicted hypergraph data structures connects multiple situation graph data structures. Multiple hyperedges may overlap and nodes in the situation graph data structures (hereafter referred to as "situation graphs") may be shared in the predicted hypergraph data structures (hereafter referred to as "hypergraphs"). The entire dynamic process in a situation, comprising one or more situation graphs, may be represented as a set of one or more consecutive and overlapped hypergraphs. Formally, the hypergraph H is a pair H=(X, E) where X is a set of nodes for objects or persons that appeared in input frames of the input video data, and E is a set of non-empty hyperedges, which connect one or more situation graphs, representing relationships between nodes of the connected one or more situation graphs. The hypergraphs represent a type of symbolic reasoning performed by the SR-BERT AI computer model. In some illustrative embodiments, a hyperedge connects particular types of classes, e.g., action classes, with different situation graph data structures with different hyperedges being able to connect to the same situation graph in some cases.

The predicted hypergraphs are input to a program executor which receives the predicted hypergraphs along with a program that is automatically and dynamically generated by a program parser. The program parser comprises a plurality of trained machine learning computer models that operate on an input natural language question to generate predictions of a set of program modules to apply to predicted hypergraph data structures to generate an answer to the input natural language question. That is, a predefined set of program modules are provided, having different program module types. The trained machine learning computer models learn associations between input natural language terms or phrases of an input natural language question, and particular ones of the predefined program modules. Thus, when presented with an input natural language question, each of the trained machine learning computer models predicts one or more program modules to apply to the input natural language question.

The predicted one or more program modules are combined into an executable program for the input natural language question, with the executable program having a nested structure of the one or more program modules. For example, after question-to-program parsing by the program parser, there is a set of predicted program modules, e.g., [Filter\_Actions\_with\_Obj], with program separators (e.g., ( ), [ ], { }) in the form of a sequence. The program executor has predefined operations of program modules/functions and parameter amounts for each program. The program executor may use a predefined ordering algorithm, such as a First-In-First-Out (FIFO) algorithm or the like, to execute the sequence of program modules. Such operation converts the sequence of program modules into a nested program that can be processed by the program executor.

Thus, the combination of program modules predicted by the program parser's machine learning computer models are input to the program executor which is configured to execute the program modules in a nested manner. Each program module predicts a set of outputs which are then used as inputs to a next program module in the nested order. In this way, the outputs are iteratively paired down to a final answer to the input question. The program modules operate on the nodes, edges, and hyperedges of the predicted hypergraph data structures to generate their outputs and then provide those outputs as input to the next program module in the nested order until a final program module is executed whose output is then used as the final answer to the input question.

It should be appreciated that by generating the predicted hypergraphs the AI computer model mechanism of the illustrative embodiments are able to abstract the situation represented in the input video data to generate predictions of relationships between the entities represented in the input video data and provide symbolic reasoning of the situation, represented by the hypergraphs and the hyperedges. In addition, by providing a program parser that takes a natural language question and represents it as a sequence of program modules to execute on hypergraph data structures, logical reasoning questions may be evaluated, such as questions concerned with interaction, sequence, prediction, or feasibility. For example, given an input video data showing a sequence of a person in an office situation having a desk, book, computer, clothing items, food items, etc., rather than being limited to answering questions about what is specifically shown in the input video data, e.g., "what color is the person's shirt?", questions such as "which object was eaten by the person?" (interaction question), "which object did the person take after they closed the book?" (sequence question), "what will the person do next?" (prediction question), and "Which other object is possible to be put down by the person?" (feasibility question). While interaction and sequence type questions reference what is shown in the images, a difference between the illustrative embodiments and existing VQA mechanisms is "how to reason" instead of "how to ask" questions. That is, the illustrative embodiments perform a hierarchical reasoning which uses lower-level entities and interaction relationships to reason the higher-level actions with relational reasoning instead of guessing actions by using visual appearances only. Thus, all questions in the illustrative embodiments are processed using predicted nested programs operating on hypergraph data structures instead of being limited to using only the explicitly represented entities and relationships in the video input only.

The question answering will allow for logical reasoning to be performed on input video data which can then provide answers that can drive further analytics or drive outputs for human use. However, it should be appreciated that the operations of the illustrative embodiments are automated and performed using complex machine learning computer models and AI mechanisms. As such, the illustrative embodiments may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein.

Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an AI computer system implementing multiple machine learning based computer models as well as a video parser and program executor, to automatically extract situation graphs from input video data, convert the situation graphs to encoded token sequences, perform predictions on the encoded token sequences to generate predicted token sequences, generate predicted hypergraphs based on the predicted token sequences, generate a program based on a natural language question, and execute that generated program on the generated hypergraphs to identify an answer to the natural language question. The improved computing tool implements mechanism and functionality, such as the video parser, transformers-based action transition model, program parser, and program executor, which cannot be practically performed by human beings either outside of, or with the assistance of, a technical environment, such as a mental process or the like. The improved computing tool provides a practical application of the methodology at least in that the improved computing tool is able to automatically, through computer artificial intelligence, answer logical reasoning questions directed to concepts outside the in-frame content of an input video sequence. Thus, the improved computing tool is able to predict sequences of objects, persons, and relationships between these objects/persons, which answer logical reasoning questions.

Moreover, while a human being may be the subject of the input video data, and human beings may utilize the output generated by the mechanisms of the illustrative embodiments, the illustrative embodiments themselves are not directed to actions performed by these human beings, but rather is directed to the particular artificial intelligence computer mechanisms, e.g., the particular arrangement of computer models, logic, and functions performed specifically by the improved computing tool on the input video data. Even though the illustrative embodiments may provide an output that ultimately assists human beings in answering logical questions directed to interactions, sequences, prediction or feasibility, the illustrative embodiments of the present invention are not directed to actions performed by the human being utilizing the results of the improved computing tool, but rather to the specific operations performed by the specific improved computing tool of the present invention which facilitates the automated processing of the input video data to answer logical questions through artificial intelligence. Thus, the illustrative embodiments are not organizing any human activity, but are in fact directed to the automated logic and functionality of an improved computing tool.

It should further be appreciated that the illustrative embodiments described herein implement, and make use of, artificial intelligence (AI) and/or cognitive systems. The purpose of these AI and/or cognitive systems is to augment, not replace, human intelligence. These AI and/or cognitive systems are designed to enhance and extend human capabilities and potential through specific improved computer tools and improved computer tool operations. These improved computer tools perform operations at a speed, complexity, and volume that is not practically able to be performed by human intelligence. While such AI and/or cognitive systems may emulate achieving similar results to that of human intelligence, they do so using different methodologies and mechanisms specific to computer tools that are not the same as any mental processes or manual efforts of human beings due, at least in part, to the inherent differences in the way that computing devices operate from the way that human minds operate.

The AI and/or cognitive systems implemented by the illustrative embodiments may operate on various types of data, which may include input video data that may include personal or private information of individuals, e.g., persons depicted in the input video data. While the AI and/or cognitive systems may operate on such personal or private information, the AI and/or cognitive computing systems may implement various mechanisms (not specifically shown in the figures) for maintaining the privacy and security of individual's personal or private information and implement a principle of trust and transparency with regard to the security of such personal or private information. This principle of trust and transparency recognizes that any person whose data is tracked and shared should always be given the option to opt-in or opt-out of such tracking and sharing of their personal or private data. This principle of trust and transparency recognizes that a person whose data is tracked and shared should always have control over the use of the data, what entities have access to that data, and the ability to have that data deleted. Moreover, this principle of trust and transparency recognizes that a person's personal or private data should be kept secure from cyber threats and that such data should not be used for purposes, such as government tracking and surveillance, which are not specifically approved by the individual who again, is the ultimate owner of this personal and/or private data.

Thus, where the AI and/or cognitive systems may operate on any such personal or private information, such as may be represented in input video data, these AI and/or cognitive system mechanisms may implement functionality for individuals to opt-in or opt-out of usage of their personal/private data, authorize entities to access their personal/private data, and provide security mechanisms to ensure that the individual's personal/private data is secure from cyber threats. These mechanisms do not require individuals to relinquish ownership rights in their personal/private data or insights derived from the personal/private data in order to have benefit of the illustrative embodiments. While the illustrative embodiments may promote and utilize free movement of data across one or more data networks which may span organizational and geopolitical borders, such free movement of data is done so using mechanisms that promote security of the personal/private data flows.

In view of the above, and before continuing the description of the various specific aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above, the illustrative embodiments provide an improved computing tool and improved computing tool operations, for providing artificial intelligence mechanisms for performing video question answering (VQA) with logical reasoning based question answering. The illustrative embodiments implement an improved computing tool that includes a video parser, a transformers-based action transition model, a program parser, and a program executor. Moreover, the illustrative embodiments operate on the data structures generated by these elements, such as the situation graph data structures, token sequences, hypergraph data structures, and program modules, to execute a generated program on generated predicted hypergraph data structures, to generate answers to logical reasoning questions about the input video data parsed by the video parser.

FIG. 1 is a block diagram illustrating the primary operation components of a situated reasoning transformer (SRT) based improved computing tool in accordance with one illustrative embodiment. As shown in FIG. 1, the AI system 100 implementing the SRT based architecture uses a video parser 120 to represent input video data 110, received from video data source computing system 102, as a set of data representations 121, 122, and 123 for human and/or object entities, and relationships between these entities. For example, the video parser 120 may be a perception module with a set of recognition models 124-127, which obtains human-centric or object-centric representations in a given situation s at time t, e.g., each timestamp t may have one or more image frames from the input video data 110 that define the situation s for that timestamp. To simplify the object/person recognition, an object detection bounding box mechanism is used to localize the objects and humans in the input video data. The recognition models 124-127 of the video parser 120 includes an object detector 124 that extracts a visual representation for each object or human in the input video data 110, a relationship detector 125, and a pose parser 126 to extract skeleton representation for human motions. The video parser 120 may include an object detecting bounding box mechanisms, for example, to detect objects and persons present in the input video data. The relationship detector may comprise a pipeline that predicts the predicate for each entity pair, such as by using a softmax distribution, or the like. The pose parser 126 may utilize a multi-region and/or multi-person pose estimation that identifies key points of a person or object structure and determines an pose of the person/object based on these key points. Any type of object, person, relationship parsing mechanisms may be used without departing from the spirit and scope of the present invention.

To recognize actions that are seen in the input video data 110, as opposed to unseen actions that are not represented in the input video data 110 itself, an action recognizer 127 may be implemented. The action recognizer 127 may utilize a neural network architectures to analyze the input video data and classify the input data as to particular actions present in the input video data. These seen actions are preconditions for multiple actions-involved reasoning situations, e.g., feasibility and sequence questions, handled by the mechanisms of the illustrative embodiments as described herein. The video parser 120 may be trained, using a machine learning process, on a set of training video data. The library of training video data comprises various input video data sequences that represent different human-object interventions in different environments. The may be randomly sampled from a library of training videos, such as may be stored in the video source computing system 102, to obtain appearance features, object category, human poses, and bound box positions, for various types of video data sequences.

The video parser 120 identifies the persons, objects, and relationships between persons and/or objects, in the input video data 110 for the various situations corresponding to the various timestamps t1 to tn. Thus, for example, for one or more image frames of the input video data 110 corresponding to timestamp t1, a set of person, object, and relation tuples may be generated. These tuples identify either person-object relationships or object-object relationships. For example, if the situation represented at timestamp t1 is a man picking up a book, then the tuple may specify (man, book, pick up) where "man" is the person, "book" is the object, and "pick up" is the relationship between the person and the object. Moreover, if the situation represented also includes a cup sitting on a desk, then a tuple may be of the type (cup, desk, on) or the like.

The persons, objects, and relationships identified through the operation of the video parser 120 are used to generate situation graph data structures 131, one for each situation corresponding to a timestamp in the input video data, which are input to the transformers based action transition model 130. The situation graph data structures 131 may comprise graphs with nodes representing entities and edges representing relationships between the entities, or entity relationships. These graph data structures may, in some illustrative embodiments, be directed graph data structures that specify the direction of the relationships represented by the edges. In addition, temporal information regarding the timing of the relationships identified in the input video data is maintained for the objects and relationships, e.g., timestamps associated with individual video segments, e.g., one or more image frames, are associated with the corresponding situation graph data structures representing that video segment, with different situation graph data structures being generated for each video segment of a sequence of video segments of the input video data 110, e.g., each timestamp of the input video data 110. Thus, the video parser 120 detects the entities and their relationships which define situations present in the input video data, where a situation describes entities, events, moments, and environments and corresponds to a trimmed portion of video with multiple consecutive or overlapped actions and interactions.

The transformer based action transition model 130 implements a situated reasoning transformer (SRT) mechanism that comprises the situation encoder 132, the dynamics transformer model 134, and the graph sequence decoder 136. The SRT mechanism learns the implicit transition process to predict missing information in the form of a generalization of the entity relationships represented in the situation graph data structures 131, as one or more predicted hypergraph data structures 140, where a hypergraph is a generalization of one or more situation graph data structures in which a hyperedge can join any number of nodes (or vertices) rather than edges connecting only two nodes (or vertices), as in the situation graph data structures. That is, the SRT comprises logic 132-136 that is trained, through a machine learning training process, to predict relationships between nodes of the individual situation graph data structures 131 to thereby generate predicted hypergraph data structures 140, where a hyperedge 141, 142 of the predicted hypergraph data structures 140 connects one or more nodes of a situation graph data structure to another one or more nodes of the same or different situation graph data structure. The SRT uses a unified schema to describe dynamic processes in real-world situations in the form of these predicted hypergraph data structures. Predicted hypergraph data structures represent actions and inner-relations, and their hierarchical structures, within situations represented in the input video data 110. Each sequence of video segments, corresponding to a situation, is a set of situation graph data structures 131 representing in-frame relations, e.g., person-object or object-object relations. Each predicted hypergraph data structure 140, on the other hand, indicates not only the in-frame relations, but also predicted relationships within and across situations represented in the input video data 110.

The situation encoder 132 of the transformers-based action transition model 130 takes the situation graph data structures 131 and encodes them into a token sequence 133. The situation encoder 132 is designed for situation representation. The situation encoder 132 encodes the connected situation graph data structures 131 as a hierarchical structured token sequence 133. The time order of situations represented by the timestamps associated with the image frames in the input video data 110 organizes the token sequence $<s^0, \ldots, s^t>$, where s is the situation for a corresponding timestamp 0 to t. Each situation s in time t corresponds to two segments, a situation graph segment and an action hyperedge segment.

As noted above, a situation graph data structure 131 segment comprises a set of human-object or object-object interaction tuples with atomic tokens: human, object, and spatial or contacting relationships $<h_i, o_j, r_j>$. All connected human or object nodes participate in the situation graph data structure segment that is encoded by the situation encoder 132, and each set of situation segment tokens in the token sequence 133 generated by the situation encoder 132 is padded with zero tokens for a unified number of situation segment tokens. Each token in a hyperedge segment, e.g., a set of one or more action tokens for each situation graph data structure connecting situation graphs, represents a specific action type $a_j$. Each token is a sum that captures information from the following types of embedding vectors: (1) token embedding: appearance representations for objects, pose representation for humans, or distributed embedding for action, relationship categories; (2) type embedding: indicates token types; (3) hyperedge embedding: indicates the hyperedge positions within each situation; (4) situation embedding: record situation time-order; and (5) segment embedding. Situation embedding and segment embedding is used to indicate situation time-order and segment type for each token. Separation embedding marks the boundary of situations and segments in the token sequence. The constructed token sequence 133 describes the structures of a set of situation graph data structures 131.

The dynamics transformer model 134 receives the constructed token sequence 133 from the situation encoder 132, and is designed to dynamically predict action states or relationships by learning the relations among the input data types in given situations. The dynamics transformer model 134 comprises a multiple-layer stacked transformer architecture with down-stream task predictors. Stacked transformer blocks are used to calculate self-attention scores for the input token sequence 133 with multiple heads. The attentions a describe the connections of each potential relationship between two nodes in situation graph data structures 131, e.g., action hyperedges or human-relationship-object triplets. Because the self-attention inner structures of transformers correspond with token pairs, the whole attention over input tokens performs a dynamic relation modeling. The neighbored node connections are summed into a single node. The aggregated effect is stored in the current state in time t and applied to the prediction for the missing information in the current step or the state next time t+1. Such dynamic attention modeling deals with all possible relations as implicit connections. It would be more robust while relationships are unknown or some of the visual clues are not reliable. This dynamics transformer model 134 is also used to predict several unseen situations for prediction questions or feasibility questions.

The dynamics transformer model 134 generates a predicted token sequence 135 based on the constructed input token sequence 133, which includes predictions for any missing information in the input token sequence 133, such as masked tokens during training, and predictions for token sequences at one or more subsequent timestamps after the last timestamp t of the input video data 110. The predicted token sequence 135 is input to the graph sequence decoder 136.

There are three self-supervision tasks that are implemented by the graph sequence decoder: action type prediction, human-object relationship type prediction, and masked token modeling (for objects or humans). The first two tasks use machine learning computer models, such as RNNs, CNNs, or the like (classifiers), to predict action hyperedges or relationships using multilayer perceptrons (MLP) with pooled global representations of all states in previous situations, e.g., situation graph data structures having prior timestamps corresponding to earlier situations in a video sequence.

Although it is assumed that the recognition models, e.g., object detector 124 and human pose detector 126 in the video parser 120, can achieve high accuracy, several objects or human poses in input video data may be blurred or invisible. The masked token modeling aims to enhance the representation robustness by reconstructing their embedding vectors. The graph sequence decoder 136 takes the input predicted token sequence 135 from the dynamics transformer model 134 and applies these classifiers and masked token modeling to the predicted token sequence 135 to generate predicted hypergraphs 140.

Thus, the graph sequence decoder 136 generates predicted hypergraphs 140 having hyperedges 141 and 142 linking one or more nodes of portions 143-146 of situation graph data structures 131. For example, the hyperedges 141-142 of the predicted hypergraphs 140 correspond to predicted tokens in the predicted token sequence 135. The predicted hypergraphs 140 are input to the program executor 170 which will execute a generated program on the predicted hypergraphs 140 to generate an answer 180 for an input question 150.

The AI system 100 also includes a language/program parser 160 that parses an input natural language question 150 and generates an executable program corresponding to the natural language question 150. The language/program parser 160 comprises a natural language parser 166 that parses the natural language question 150 in a manner generally known in the art and provide the parsed natural language content to encoder 161 to generate an encoding of the input natural language question 150 in a manner generally known in the art. The encoding of the natural language question 150 is then input to a plurality of machine learning models 162-164 that have been trained to predict what program modules to use to handle answer generation for natural language questions based on a set of input features of the question encoding from encoder 161. These machine learning models 162-164 may be implemented, for example, as Long Short Term Memory (LSTM) decoders with attention mechanisms. The machine learning models 162-164 each output a prediction of a program module and/or program functions from the predefined program modules in the program module library 190 that should be applied to predicted hypergraphs to generate an answer to the input question 150. These machine learning models 162-164 may be trained using a training set of natural language input questions which are processed to generate program module predictions which are then corrected according to ground truth program module information so as to iteratively train the machine learning models to generate improved predictions of which program modules correspond to language elements of the input natural language questions.

The predicted program modules/functions are provided to the program executor 170 which performs a symbolic reasoning over the predicted hypergraph data structures 140, actions, or other data types, using nested program modules/functions. The reasoning is a top-down process for a given input question 150. The program executor 170 takes all predicted hypergraphs as an initial input and starts from a first data type mentioned in the input question 150. Then the program executor 170 iteratively passes through all the valid operations and output answers in a final step.

Thus, given an input video data 110 comprising a plurality of input images for different timestamps of a video sequence, the AI system 100 of the illustrative embodiments generates predicted hypergraph data structures that include predictions for missing information in the situation graph data structures of the input video data 110 and predictions for one or more future timestamps not represented in the input video data 110. These predicted hypergraphs 140 comprise hyperedges 141, 142 that represent this missing information and/or predicted relationships between nodes of the situation graph data structures of the timestamped video data. The AI system 100 of the illustrative embodiments also receives an input natural language question and generates a program with nested program modules/functions that correspond to the input natural language question, and which can be executed on predicted hypergraphs to generate an answer to the input natural language question. These input natural language questions may be of a type requiring logical reasoning such as questions directed to interactions, sequences, predictions, or feasibility evaluations.

It should be appreciated that the AI system 100 of the illustrative embodiments utilizes machine learning models which are trained through machine learning processes to learn relationships between patterns of input features and particular output predictions. As such, during training, the AI system 100 may be provided with training input video data 110 where the annotations of persons, objects, and relations may be known, e.g., ground truth values. The model organizes the input graph data to a structured token sequence which consist of graph nodes and relations. The situation encoder 132 may generate a token sequence using various masks that mask particular tokens in the token sequence that correspond to types of tokens that the machine learning training is training the dynamics transformer model 134 to predict. For example, the machine learning may iteratively apply different masks to the token sequence 133 to generate masked token sequences which are then input to the dynamics transformer 134 which operates to predict the predicted token sequence, including tokens for the masked tokens. Based on a ground truth comparison, errors in the predictions generated by the dynamics transformer model 134 may be determined and used to adjust attention weights or the like, of the dynamics transformer model 134 to reduce the error in the dynamics transformer model 134 predictions. This process may be repeated for a plurality of different input video data 110 sequences and for a plurality of different masks.

Similar training can be applied to the machine learning models of the graph sequence decoder 136. It should be appreciated that the entire transformer model (encoder-decoder-classifier) may be trained with an end-to-end strategy instead of separate training of each separate element, e.g., separate training of encoder, separate training of decoder, and separate training of classifier.

During runtime operation, after the dynamics transformer model 134 and graph sequence decoder 136 have been trained, these elements operate on new input video data sequences to predict any missing tokens and/or token sequences at future time points not represented in the input video data 110 and thereby generate predicted hypergraph data structures. That is, while the new input video data may not be masked using the masks, the new input video data may have missing information, such as blurred image data or the like, which may be predicted by the dynamics transformer model 134. Moreover, the dynamics transformer model 134 may operate to predict a sequence of tokens for a next timestamp t+1 not represented in the input video data, such that the corresponding predicted hypergraphs may be used to answer predictive or feasibility questions.

In addition, during training, the language/program parser 160 may be presented with sets of training input questions corresponding to different logical reasoning questions that are to be converted into an executable program for execution on predicted hypergraphs. The machine learning process of training the models implemented by the language/program parser 160 may use a similar iterative process for adjusting attention weights or the like, to reduce errors in predictions, using a ground truth error evaluation mechanism. That is, the language/program parser 160 may operate on an input natural language question to predict program modules/functions to be combined to generate a program for the input question, and these predictions may be compared against a ground truth to determine an error and then adjust attention weights to reduce this error over the iterations. Once trained, the language/program parser 160 may be applied to new input questions and may generate programs for execution by the program executor 170 on predicted hypergraphs 140 to generate a resulting answer 180.

Thus, the illustrative embodiments provide an improved computing tool and improved computing tool operations for predicting relationships that are not explicitly shown in an input video sequence and answer logical reasoning questions based on these predictions of relationships. The illustrative embodiments utilize predicted token sequences to generate predicted hypergraphs from a set of input situation graph data structures, and utilize a predicted program to execute on the predicted hypergraphs, to generate answers to such logical reasoning questions. Such logical reasoning questions may take the form of questions asking about interactions that span a plurality of situations, sequences of interactions, prediction of what happens next, and questions about the feasibility of certain actions, all of which cannot be answered by existing video question answering (VQA) mechanisms which are limited to answering questions about what is explicitly shown in the video images themselves.

Figure 2:
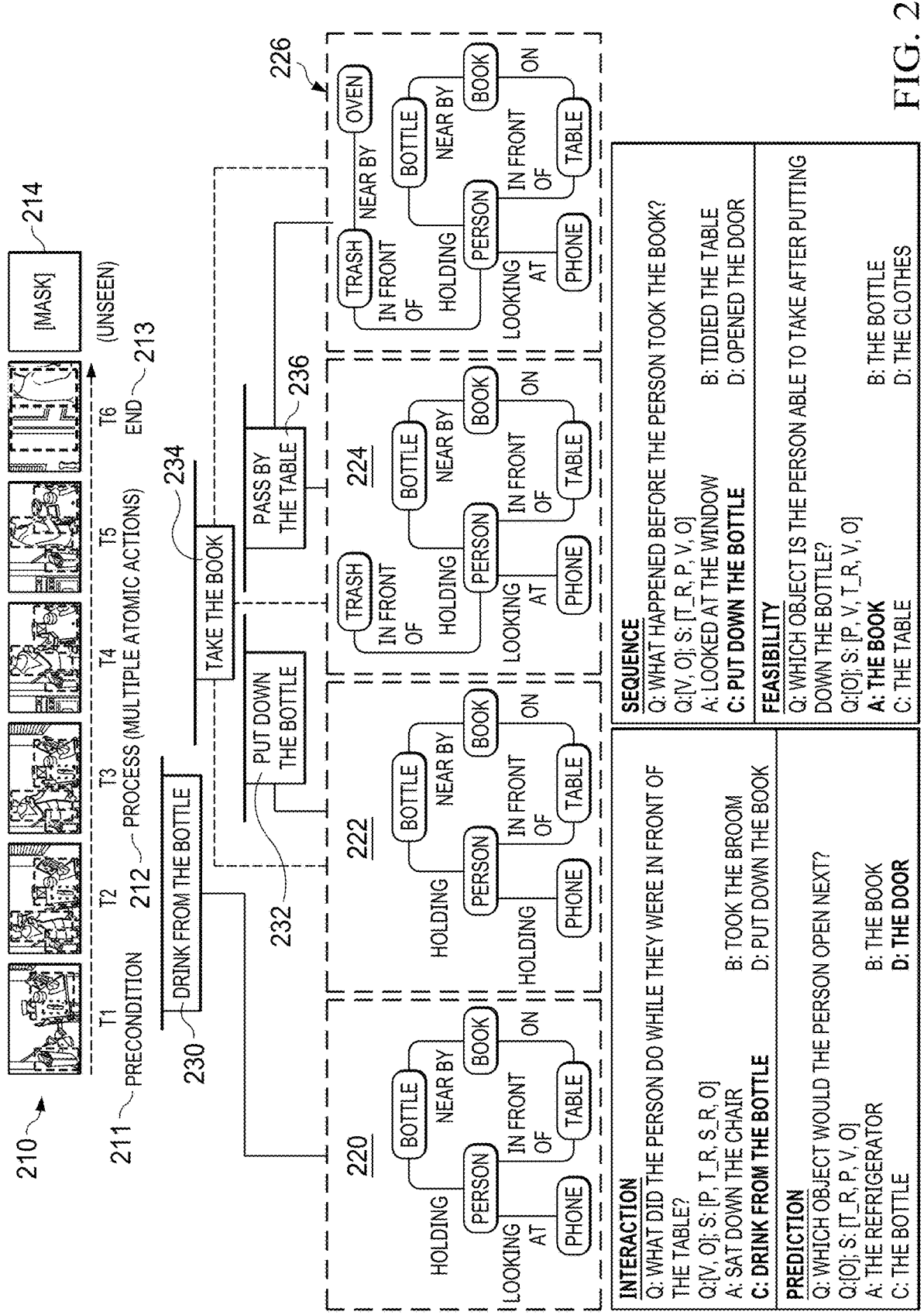
FIG. 2 is an example diagram illustrating example situations depicted in input video data, along with corresponding situation graph data structures and hyperedges for answering logical reasoning questions, in accordance with one illustrative embodiment.

As mentioned above, the AI system of the illustrative embodiments implements a video parser 120 that identifies persons, objects, and relationships actually seen in the input video data 110, which is then used as a basis for generating situation graph data structures for each timestamp in the input video data 110. Moreover, input questions directed to logical reasoning may be encoded and answered by the language/program parser 160 and program executor 170 based on an execution of a generated program on predicted hypergraph data structures. FIG. 2 is an example diagram illustrating example situations depicted in input video data, along with corresponding situation graph data structures and hyperedges for answering logical reasoning questions, in accordance with one illustrative embodiment. Moreover, FIG. 2 shows examples of logical reasoning questions, their encodings, and corresponding correct/incorrect answers to the logical reasoning questions.

As shown in FIG. 2, the video sequence 210 comprises a precondition portion 211, a process portion 212, an end portion 213, and an unseen or future portion 214. The precondition portion 211 comprises a depiction of an environment prior to human interaction with objects in the environment. The process portion 212 comprises one or more situations corresponding to timestamps where multiple atomic actions are represented in the input video data, e.g., interactions between a human and objects in the environment. The end portion 213 represents a portion of the video sequence where interactions are no longer present. The unseen or future portion 214 comprises actions not represented in the input video data sequence 210.

Each situation represented in the input video data sequence 210, may be represented as a situation graph data structure 220, 222, 224, 226. In some illustrative embodiments, these situations correspond to timestamps in the input video data sequence 210. The situation graph data structures 220-226 comprise nodes representing objects/persons present in the corresponding images of the situation, and edges representing the relationships between these objects/persons. It should be appreciated that some objects/relationships may be masked or not represented in the situation, and are grayed out. For example, in the situation graph data structures 220-226, the object "phone" and the relationship between the person node and the masked or unseen object "phone" may be grayed out meaning that they are not seen or are masked in the input video data sequence 210.

Thus, for example, the situation graph data structure 220 comprises nodes for "person", "bottle", "book", "table", and "phone". The situation graph data structure 220 further includes edges for the person holding the bottle, the person being in front of the table, the person looking at the phone, the book being on the table, and the bottle being nearby the book. Situation graph data structure 224 further incudes a node for "trash" and an edge for the person being in front of the trash. Situation graph data structure 226 further includes a node for the "oven" object and an edge that indicates the trash is nearby the oven. These objects, persons, and relationships are detected by the video parser using known video parsing mechanisms for object identification and relationship identification as discussed above.

Through the mechanisms of the illustrative embodiments, the AI system of the illustrative embodiments generates predicted hypergraphs that provide predicted hyperedges between nodes of the same or different situation graph data structures. For example, the mechanisms of the illustrative embodiments may predict that a missing edge within situation graph data structure is the hyperedge 230 that the person can "drink from" the bottle. Moreover, the illustrative embodiments may predict that another missing edge in the situation graph data structure 222 may be that the person may "put down" the bottle, which is represented by hyperedge 232. Moreover, hyperedges 234 and 236 represent other relationships or actions that may be predicted by the mechanisms of the illustrative embodiments, such as the person can "take" the book 234.

FIG. 2 also shows examples of the logical reasoning questions that may be processed by the mechanisms of the illustrative embodiments for the input video data sequence 210. For example, an interaction logical reasoning question that may be input to the language/program parser and converted to a program that executes on the predicted hypergraph to generate an answer to the input question, may be of the type "What did the person do while they were in front of the table?" The elements of the figure showing Q:[V, O], S:[P, T_R, S_R, O], and the like, are specifying the data types in the questions (Q) and situations (S). As shown in FIG. 2, the processing of the question through the mechanism of the illustrative embodiments may generate various answers, with one answer being the correct answer and being represented in a ground truth during training so as to train the models of the AI system to generate the correct answer. For example, for the interaction question, the correct answer is c "Drink from the bottle".

An example of the sequence logical reasoning question may be of the type "What happened before the person took the bottle?" with the correct answer being "put down the bottle." Similarly, an example of a prediction logical reasoning question may be of the type "which object would the person open next?" with the answer in this case being d "the door". An example of a feasibility logical reasoning question may be of the type "which object is the person able to take after putting down the bottle?" with the correct answer being a "the book". The correct answers may be specified as ground truth answers during training, and may be answers generated by the mechanisms of the illustrative embodiments during runtime operation of the VQA with logical reasoning AI system of the illustrative embodiments.

FIG. 3 is an example diagram of the structure of a hypergraph token sequence for representations in SRT encoding in accordance with one illustrative embodiment. As shown in FIG. 3, each token in the sequences 1 and 2 is represented by a column having multiple rows, each row corresponding to a different embedding that embeds information about the element of the input image sequence represented by the token. For example, each token has a token embedding (vector), a type embedding, a triplet embedding, a hyperedge embedding, and a situation embedding. Integer values in FIG. 3 represent either an order id (for positional tokens) or class id (for other tokens), with the value of "MAX" meaning not applicable or "NA." The letter designations indicate a type of token, e.g., action (A), person (P), relationship (R), object (O), or separator (M).

FIG. 4 is an example program module listing for automatic program generation by a program parser in accordance with one illustrative embodiment. In the depiction of FIG. 4, the "actions", "verbs", "objects", and "relationships" are the list of corresponding entities from the predicted hypergraph data structures corresponding to these basic data types. An action data type may be a tuple containing an action class, start, and end time, e.g., (c102, 15.0, 22.1). The verb, object, and relationship may be the corresponding verb, object, or relationship in a given vocabulary, e.g., "take," "laptop," and "over", respectively. The "situations" is a combination of the basic data types. A "set" represents the set of basic verbs, objects, relationships, or actions.

The program modules and corresponding functions may correspond to predetermined program modules of a program module library that may be selected using the prediction mechanisms of the language/program parser based on a processing of an input natural language question. As shown in FIG. 4, the program modules/functions have program module types, e.g., input, element, filter, query, and logic, with corresponding program modules or functions defined with a function name and description that describes what operations the program modules/functions perform on a predicted hypergraph data structure. For example, an input type program module includes the "situations" program module or function whose operation is to return all situations represented in the predicted hypergraph. Similarly, the filter type program modules/functions have a plurality of different program modules/functions, each performing different types of operations as specifying in their descriptions, e.g., the "Filter_Actions_with_Verb" program module/function selects actions from input actions with the input verb, where the input actions would be actions represented by edges in the predicted hypergraph data structure, and the verb being the verb specified in the input natural language question and/or verbs associated with the verb specified in the input natural language question, e.g., synonyms or the like.

The inputs and outputs columns of FIG. 4 show the inputs to the corresponding program module/function and the outputs generated by the corresponding program module/function. For example, the input to the program module "Filter_Actions_with_Verb" is (actions, verb) where the actions are obtained from the predicted hypergraph data structure input to the program executor, and the verb is the verb (and/or synonyms) specified in the input natural language question. The "Filter_Actions_with_Verb" program module/function outputs the actions that include the input verb.

These program modules/functions may be predefined in a program module/function library and may be selected for combining into an executable program based on the particular input natural language question processed by the machine learning computer models of the language/program parser of the illustrative embodiments. Thus, based on the particular input natural language question received, different combinations of program modules/functions may be combined to address the particular input question. The particular program modules/functions selected will be based on the machine learning training of the machine learning computer models which predict the program modules/functions that are most applicable to answering the input question.

The predicted program modules/functions are input to a program executor which combines the program modules/functions into an executable program comprising a nested execution sequence of these program modules/functions. Each level of the nested execution sequence generates an output upon which the next level of the nested execution sequence operates. In this way, the outputs are iteratively reduced down to a single final answer to the input question.

FIG. 5 is an example of automatically generated programs for four example question types in accordance with one illustrative embodiment. FIG. 5 shows an example of an interaction question, a sequence question, a prediction question, and a feasibility question. Examples of the corresponding programs generated by the program executor based on the selection of program modules/functions from the listing of predefined program modules/functions in FIG. 4 are shown for each of these question types. As can be seen from FIG. 5, each of these programs comprise a nested program module/function architecture where the output of a program module/function is provided as input to the next program module/function in the nested architecture.

Figure 6:
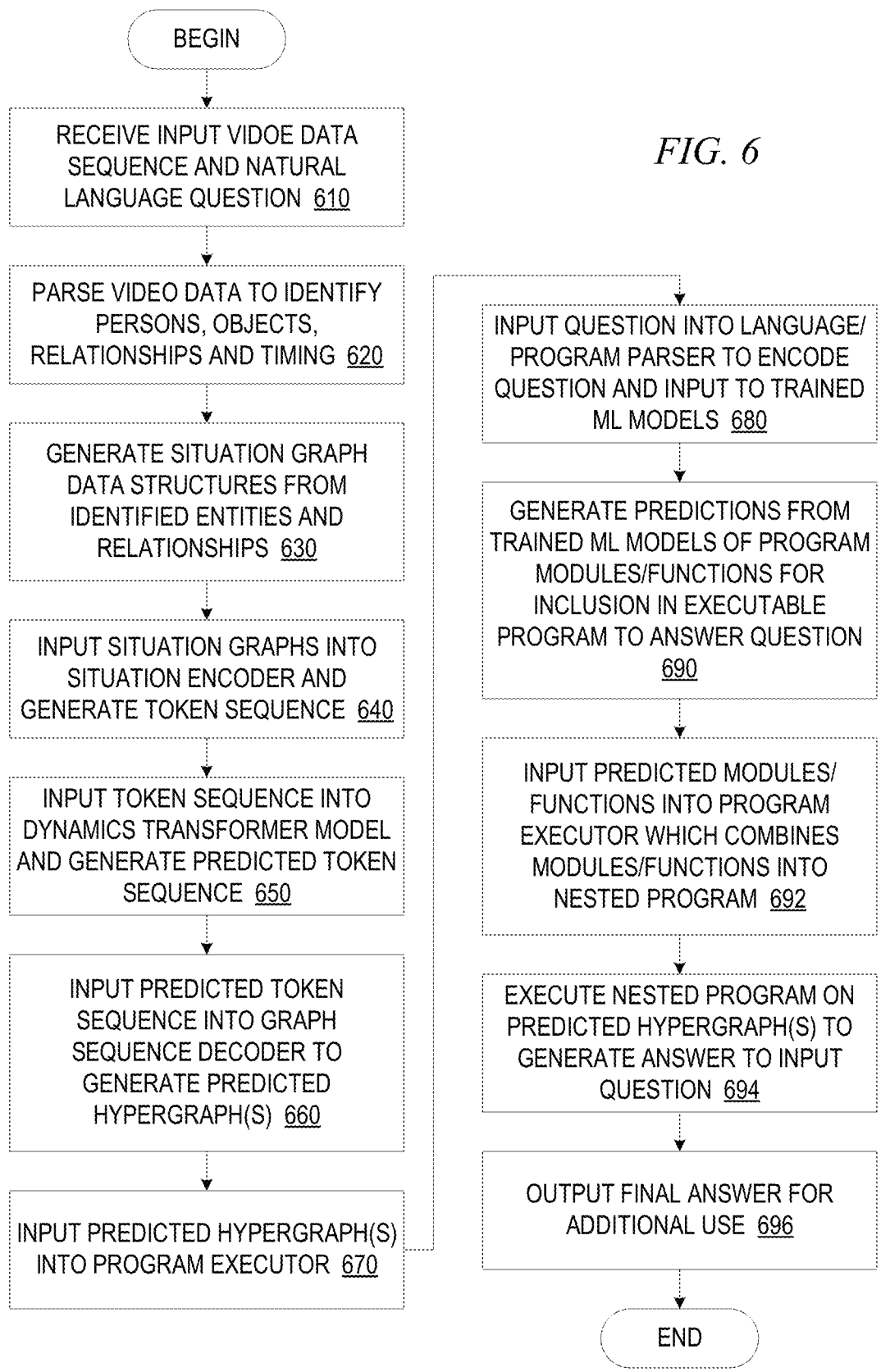
FIG. 6 is a flowchart outlining an example operation of an improved computing tool in accordance with one illustrative embodiment.

FIG. 6 is a flowchart outlining an example operation of an improved computing tool in accordance with one illustrative embodiment. The operation shown in FIG. 6 assumes that the machine learning computer models of the video question answering (VQA) with logical reasoning AI system of the illustrative embodiments have been trained through machine learning processes to generate predictions with regard to predicted token sequences, predicted hypergraph data structures, and predicted program modules/functions, as previously described above. Thus, the operation outlined in FIG. 6 is a runtime operation for processing logical reasoning questions, such as questions directed to asking about interactions, sequences, generating predictions, or determining feasibility, for which the answers may be "unseen" or missing in an input video data sequence. It should be appreciated that while FIG. 6 shows operations being performed in a sequential order, this is not required and operations that can be performed in parallel or at substantially a same time as other operations may be performed in such a parallel manner, e.g., the operations of the language/program parser may operate on the input natural language question at substantially a same time that the video parser and transformers based action transition model are operating on the input video data sequence.

As shown in FIG. 6, the operation starts by receiving an input video data sequence and an input natural language question (step 610). The input video data sequence is parsed by a video parser to generate data representations for persons, objects, and relationships identified in the input video data sequence, with the temporal features of these identified persons, objects, and relationships being maintained, e.g., timestamps associated with their identification in the input video data sequence (step 620). From the identified persons, objects, and relationships, situation graph data structures are generated (step 630). The situation graph data structures are input to a situation encoder which generates a token sequence for the situation graph data structures (step 640). The token sequence is input to a trained dynamics transformer model that generates a predicted token sequence based on the input token sequence, where the predicted token sequence comprises predictions for missing information, e.g., missing tokens, in the input token sequence, and/or predictions for a token sequence at a time point not represented in the input video data sequence, e.g., time t+1 where t is the final timestamp of the input video data sequence (step 650).

The predicted token sequence is input to a graph sequence decoder which generates one or more predicted hypergraph data structures based on the predicted token sequence (step 660). The predicted hypergraph data structures are input to a program executor (step 670).

The input natural language question is input to a language/program parser which parses the input natural language question and encodes the input natural language question for input to a plurality of trained machine learning computer models (step 680). The plurality of trained machine learning computer models operate on the features represented by the question encoding to generate predictions of predefined program modules/functions that should be used to generate a program to evaluate the answer to the input natural language question (step 690). The predicted program modules/functions are input to the program executor which combines the predicted program modules/functions into a nested program (step 692). The program executor executes the nested program on the predicted hypergraph data structures to generate an answer to the natural language input question (step 694). The final answer is then output (step 696) and the operation terminates.

It should be appreciated that the final answer output in step 696 will be used differently depending on the particular implementation of the mechanisms of the illustrative embodiments. For example, in some illustrative embodiments, the final answer is returned to the originator of the input natural language question where ethe final answer may be rendered on a computing device or the like so as to inform a user of the answer to the question. In other illustrative embodiments, the final answer may be used to generate commands for causing a computing device or robotic device to implement operations or actions corresponding to the final answer. A plethora of other possible uses of the final answer will also become apparent to those of ordinary skill in the art in view of the present description, such as, but not limited to, intelligent chat systems, medical assistance systems, home robotics systems, and the like. Essentially any system that operates based on logical reasoning over an input image sequence may integrate and benefit from the mechanisms of the illustrative embodiments to assist with answering logical reasoning questions about an input image sequence (video) to drive performance of other computerized or robotic operations. Any potential implementation and practical use of the final answer is intended to be encompassed in the present description.

The illustrative embodiments may be utilized in many different types of data processing environments which may include environments comprising a single computing system in which the mechanisms of the illustrative embodiments operate, with which a user may interact through interfaces and peripheral devices to input natural language questions regarding video data and receive answers, or distributed data processing environments comprising a plurality of computing devices. Moreover, as touched upon above, in some illustrative embodiments, the mechanisms of the illustrative embodiments may be implemented as autonomous computing systems, such as autonomous robotic systems or the like, which may operate on video received via the autonomous computing system's sensors, e.g., video cameras or the like, may formulate questions regarding the objects identified in the video data, and have the mechanisms of the illustrative embodiments answer those questions to generate commands for performance of actions by the robotic or autonomous computing system. Many other types of computing environments will be apparent to those of ordinary skill in the art in view of the present description, and each of these other computing environments are intended to be within the spirit and scope of the present invention and illustrative embodiments.

Figure 7:
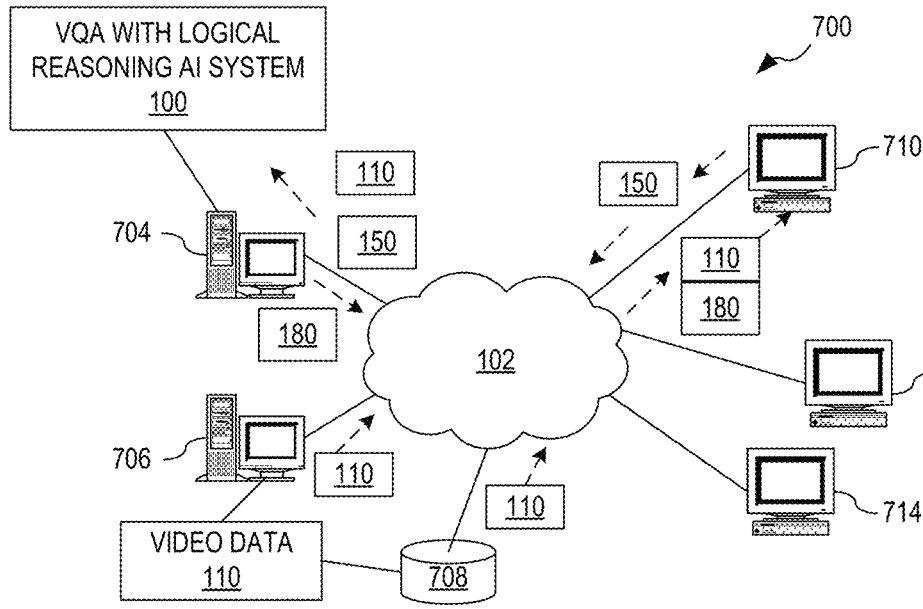
FIG. 7 is an example diagram of a distributed data processing system in which aspects of the illustrative embodiments may be implemented.
Figure 8:
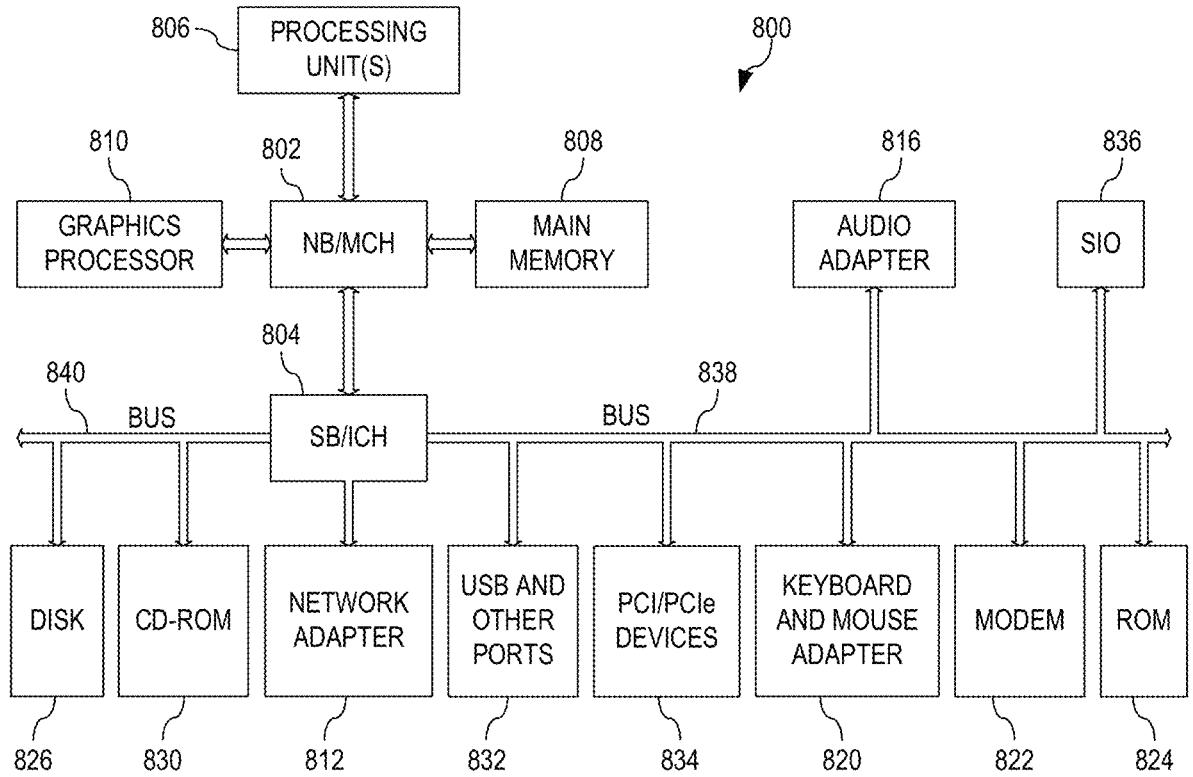
FIG. 8 is an example block diagram of a computing device in which aspects of the illustrative embodiments may be implemented.

In order to provide an example context for the present description with regard to example computer environments, FIGS. 7 and 8 are provided hereafter as examples of such environments in which aspects of the illustrative embodiments may be implemented. It should be appreciated that FIGS. 7 and 8 are only examples and are not intended to assert or imply any limitation with regard to the environments in which aspects or embodiments of the present invention may be implemented. Many modifications to the depicted environments may be made without departing from the spirit and scope of the present invention.

FIG. 7 depicts a pictorial representation of an example distributed data processing system in which aspects of the illustrative embodiments may be implemented. Distributed data processing system 700 may include a network of computers in which aspects of the illustrative embodiments may be implemented. The distributed data processing system 700 contains at least one network 702, which is the medium used to provide communication links between various devices and computers connected together within distributed data processing system 700. The network 702 may include connections, such as wire, wireless communication links, or fiber optic cables.

In the depicted example, server 704 and server 706 are connected to network 702 along with storage unit 708. In addition, clients 710, 712, and 714 are also connected to network 702. These clients 710, 712, and 714 may be, for example, personal computers, network computers, or the like. In the depicted example, server 704 provides data, such as boot files, operating system images, and applications to the clients 710, 712, and 714. Clients 710, 712, and 714 are clients to server 704 in the depicted example. Distributed data processing system 700 may include additional servers, clients, and other devices not shown.

In the depicted example, distributed data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 700 may also be implemented to include a number of different types of networks, such as for example, an intranet, a local area network (LAN), a wide area network (WAN), or the like. As stated above, FIG. 7 is intended as an example, not as an architectural limitation for different embodiments of the present invention, and therefore, the particular elements shown in FIG. 7 should not be considered limiting with regard to the environments in which the illustrative embodiments of the present invention may be implemented.

As shown in FIG. 7, one or more of the computing devices, e.g., server 704, may be specifically configured to implement a VQA system that implements the logical reasoning AI mechanisms of the illustrative embodiments, including the elements of AI system 100 from FIG. 1. That is, the VQA system includes the video parser 120, the transformers based action transition model 130, the language/program parser 160, and program executor 170 in FIG. 1, operating in a manner as described previously with regard to one or more of the illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the automated AI based answering of logical reasoning natural language questions with regard to a particular video sequence, e.g., questions directed to one or more of interactions, sequences, predictions, or feasibility.

As one example, using the depiction in FIG. 7, a user of a client computing device, e.g., client computing device 710, may view a video sequence represented by video data 110 which may be stored on a server computing device, in a network attached storage 708, or the like. For example, via a web browser application, a user may navigate to a server 706 or storage device 708 and access the video data 110 which is then rendered on the client computing device 710. Alternatively, in some illustrative embodiments, the video data may be provided by the same computing system(s) that implement the AI system 100 of the illustrative embodiments such that the user logs onto the server 704, for example, to access the video data.

The user of the client computing device 710 may wish to ask a logical reasoning question about that video data 110 and thus, may submit the natural language question 150 to the mechanisms of the illustrative embodiments through the web browser and/or web page or other interface associated with the AI system 100. The AI system 100 operates on the video data 110 and the input question 150 in a manner such as described previously with regard to FIG. 1, to generate a final answer 180 which is then returned to the client computing device 710. At the client computing device 710, the final answer 180 may be output to the user for the user's use. Thus, the answer to a logical reasoning question regarding an input video sequence may be provided to the user using automated machine learning based VQA systems augmented to processing logical reasoning questions by automatically generating programs and predicted hypergraph data structures for the natural language question and input video data.

As noted above, the mechanisms of the illustrative embodiments utilize specifically configured computing devices, or data processing systems, to perform the operations for performing VQA operations with logical reasoning question answering using predicted hypergraph data structures and generated programs specific to the input natural language question being asked. These computing devices, or data processing systems, may comprise various hardware elements which are specifically configured, either through hardware configuration, software configuration, or a combination of hardware and software configuration, to implement one or more of the systems/subsystems described herein. FIG. 8 is a block diagram of just one example data processing system in which aspects of the illustrative embodiments may be implemented. Data processing system 800 is an example of a computer, such as server 704 in FIG. 7, in which computer usable code or instructions implementing the processes and aspects of the illustrative embodiments of the present invention may be located and/or executed so as to achieve the operation, output, and external effects of the illustrative embodiments as described herein.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 may be connected to NB/MCH 802 through an accelerated graphics port (AGP).

In the depicted example, local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 836 may be connected to SB/ICH 804.

An operating system runs on processing unit 806. The operating system coordinates and provides control of various components within the data processing system 800 in FIG. 8. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 800.

As a server, data processing system 800 may be, for example, an IBM eServer™ System p® computer system, Power™ processor based computer system, or the like, running the Advanced Interactive Executive (AIX®) operating system or the LINUX® operating system. Data processing system 800 may be a symmetric multiprocessor (SMP) system including a plurality of processors in processing unit 806. Alternatively, a single processor system may be employed.

Instructions for the operating system, the object-oriented programming system, and applications or programs are located on storage devices, such as HDD 826, and may be loaded into main memory 808 for execution by processing unit 806. The processes for illustrative embodiments of the present invention may be performed by processing unit 806 using computer usable program code, which may be located in a memory such as, for example, main memory 808, ROM 824, or in one or more peripheral devices 826 and 830, for example.

A bus system, such as bus 838 or bus 840 as shown in FIG. 8, may be comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, may include one or more devices used to transmit and receive data. A memory may be, for example, main memory 808, ROM 824, or a cache such as found in NB/MCH 802 in FIG. 8.

As mentioned above, in some illustrative embodiments the mechanisms of the illustrative embodiments may be implemented as application specific hardware, firmware, or the like, application software stored in a storage device, such as HDD 826 and loaded into memory, such as main memory 808, for executed by one or more hardware processors, such as processing unit 806, or the like. As such, the computing device shown in FIG. 8 becomes specifically configured to implement the mechanisms of the illustrative embodiments and specifically configured to perform the operations and generate the outputs described herein with regard to the AI system 100 of FIG. 1.

Those of ordinary skill in the art will appreciate that the hardware in FIGS. 7 and 8 may vary depending on the implementation. Other internal hardware or peripheral devices, such as flash memory, equivalent non-volatile memory, or optical disk drives and the like, may be used in addition to or in place of the hardware depicted in FIGS. 7 and 8. Also, the processes of the illustrative embodiments may be applied to a multiprocessor data processing system, other than the SMP system mentioned previously, without departing from the spirit and scope of the present invention.

Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device that is configured with flash memory to provide non-volatile memory for storing operating system files and/or user-generated data, for example. Essentially, data processing system 800 may be any known or later developed data processing system without architectural limitation.

As described above, the illustrative embodiments provide an improved artificial intelligence mechanism for performing logical reasoning over a set of input images, e.g., video input, to answer natural language questions requiring such logical reasoning rather than merely answering questions about what is explicitly shown in the images themselves. The illustrative embodiments are able to power artificial intelligence computer models with logical thinking via both of visual perception and cognition, rather than merely object or relationship recognition.

It should be appreciated that while the above illustrative embodiments operate by generating situation graph data structures for images of an input video sequence, the illustrative embodiments are not limited to such. Rather, the illustrative embodiments may utilize any data representation that preserves temporal information and entity relationship information for entities and relationships detected in input image data. The situation graph data structure embodiments are only intended to be non-limiting examples.

In addition, it should be appreciated that while an example encoding and program module structure are used herein for illustrative purposes, the illustrative embodiments are not limited to these specific examples. To the contrary, any suitable encoding and any suitable set of program modules and program module structure may be used without departing from the spirit and scope of the illustrative embodiments. The encoding and program module structure shown in the figures and described above are only intended to be non-limiting examples.

Moreover, while the illustrative embodiments implement a transformer type model architecture and specific combinations of transformer models, LSTMs, etc., the illustrative embodiments are not limited to this particular architecture or these particular computer models. To the contrary, any suitable set or architecture of machine learning computer models that achieve a similar operation may be used without departing from the spirit and scope of the present invention. The architecture and computer models described herein and shown in the figures are intended to be non-limiting examples and are provided for illustrative purposes to demonstrate one possible architecture and arrangement of computer models that may be used to implement illustrative embodiments of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for performing artificial intelligence-based video question answering, the method comprising:

parsing, by a video parser of the data processing system, an input video data sequence to generate a plurality of situation data structures, each situation data structure comprising data elements corresponding to entities, and first relationships between entities, identified by the video parser as present in one or more images of the input video data sequence;

executing at least one first machine learning computer model of the data processing system on the plurality of situation data structures to predict one or more second relationships between at least two of the situation data structures in the plurality of situation data structures;

determining, by at least one second machine learning computer model of the data processing system executing on a received input natural language question, an executable program to execute to answer the received input natural language question;

executing, by the data processing system, the determined executable program on the plurality of situation data structures and the predicted one or more second relationships; and outputting, by the data processing system, an answer to the input natural language question based on results of executing the determined executable program, wherein the at least one first machine learning computer model comprises a situation encoder that encodes the situation data structures to generate a generated token sequence corresponding to the entities and relationships represented in the plurality of situation data structures, and a machine learning trained dynamics transformer computer model that processes the generated token sequence and predicts a subsequent token sequence, subsequent to the generated token sequence, to thereby generate a predicted token sequence.

2. The method of claim 1, wherein the at least one first machine learning computer model further comprises a sequence decoder, and wherein the sequence decoder generates the predicted one or more second relationships, based on the predicted token sequence, as one or more predicted hypergraph data structures.

3. The method of claim 2, wherein the at least one second machine learning computer model comprises a language/program parser and program executor, and wherein determining the executable program comprises:

processing, by the language/program parser, the input natural language question to predict, based on terms or phrases in the input natural language question, a plurality of program modules to execute to answer the input natural language question, wherein the plurality of program modules are selected as a subset of a set of predefined program modules stored in a program module library;

dynamically combining, by a program executor, the plurality of program modules into an executable program that is executed on the one or more predicted hypergraph data structures to generate a final answer to the input natural language question; and outputting, by the data processing system, the final answer to the input natural language question.

4. The method of claim 2, wherein each hypergraph data structure comprises one or more hyperedges connecting a first situation data structure in the plurality of situation data structures, to at least one second situation data structure.

5. The method of claim 4, wherein each hyperedge in the one or more hyperedges comprises a predicted action corresponding to at least one first entity in the first situation data structure with at least one second entity in the at least one second entity data structure.

6. The method of claim 1, wherein the input natural language question is a logical reasoning question of either an interaction question type, a sequence question type, a prediction question type, or a feasibility question type.

7. A computer program product comprising a non-transitory computer readable storage medium having a computer readable program stored therein, wherein the computer readable program, when executed in a data processing system, causes the data processing system to:
   parse, by a video parser of the data processing system, an input video data sequence to generate a plurality of situation data structures, each situation data structure comprising data elements corresponding to entities, and first relationships between entities, identified by the video parser as present in one or more images of the input video data sequence;
   execute at least one first machine learning computer model of the data processing system on the plurality of situation data structures to predict one or more second relationships between at least two of the situation data structures in the plurality of situation data structures;
   determine, by at least one second machine learning computer model of the data processing system executing on a received input natural language question, an executable program to execute to answer the received input natural language question;
   execute, by the data processing system, the determined executable program on the plurality of situation data structures and the predicted one or more second relationships; and
   output, by the data processing system, an answer to the input natural language question based on results of executing the determined executable program, wherein the at least one first machine learning computer model comprises a situation encoder that encodes the situation data structures to generate a generated token sequence corresponding to the entities and relationships represented in the plurality of situation data structures, and a machine learning trained dynamics transformer computer model that processes the generated token sequence and predicts a subsequent token sequence, subsequent to the generated token sequence, to thereby generate a predicted token sequence.

8. The computer program product of claim 7, wherein the at least one first machine learning computer model further comprises a sequence decoder, and wherein the sequence decoder generates the predicted one or more second relationships, based on the predicted token sequence, as one or more predicted hypergraph data structures.

9. The computer program product of claim 8, wherein the at least one second machine learning computer model comprises a language/program parser and program executor, and wherein the computer readable program further causes the data processing system to determine the executable program at least by:
   processing, by the language/program parser, the input natural language question to predict, based on terms or phrases in the input natural language question, a plurality of program modules to execute to answer the input natural language question, wherein the plurality of program modules are selected as a subset of a set of predefined program modules stored in a program module library;
   dynamically combining, by a program executor, the plurality of program modules into an executable program that is executed on the one or more predicted hypergraph data structures to generate a final answer to the input natural language question; and
   outputting, by the data processing system, the final answer to the input natural language question.

10. The computer program product of claim 8, wherein each hypergraph data structure comprises one or more hyperedges connecting a first situation data structure in the plurality of situation data structures, to at least one second situation data structure.

11. The computer program product of claim 10, wherein each hyperedge in the one or more hyperedges comprises a predicted action corresponding to at least one first entity in the first situation data structure with at least one second entity in the at least one second entity data structure.

12. An apparatus comprising:
   at least one processor; and
   at least one memory coupled to the at least one processor, wherein the at least one memory comprises instructions which, when executed by the at least one processor, cause the at least one processor to:
   parse, by a video parser of the data processing system, an input video data sequence to generate a plurality of situation data structures, each situation data structure comprising data elements corresponding to entities, and first relationships between entities, identified by the video parser as present in one or more images of the input video data sequence;
   execute at least one first machine learning computer model of the data processing system on the plurality of situation data structures to predict one or more second relationships between at least two of the situation data structures in the plurality of situation data structures;
   determine, by at least one second machine learning computer model of the data processing system executing on a received input natural language question, an executable program to execute to answer the received input natural language question;
   execute, by the data processing system, the determined executable program on the plurality of situation data structures and the predicted one or more second relationships; and
   output, by the data processing system, an answer to the input natural language question based on results of executing the determined executable program, wherein the at least one first machine learning computer model comprises a situation encoder that encodes the situation data structures to generate a generated token sequence corresponding to the entities and relationships represented in the plurality of situation data structures, and a machine learning trained dynamics transformer computer model that processes the generated token sequence and predicts a subsequent token sequence, subsequent to the generated token sequence, to thereby generate a predicted token sequence.

13. The method of claim 1, wherein the predicted token sequence is a token sequence having tokens with timestamps that are after a last timestamp of the generated token sequence.

14. The method of claim 3, wherein the program parser executes one or more trained machine learning computer models, to predict the plurality of program modules based on learned associations between input natural language terms or phrases of input natural language questions, and particular predefined program modules of the plurality of predefined program modules.

15. The method of claim 1, wherein:
  the video parser is a trained machine learning model trained using a machine learning process on a set of training video data and is trained by the machine learning process to obtain appearance features, object category, human poses, and bound pox positions for various types of video data sequences, and
  the at least one first machine learning computer model is trained through a machine learning training process to predict relationships between nodes of situation graph data structures to thereby generate hyperedges between situation graph data structures.

16. The method of claim 1, wherein the generated token sequence is a hierarchical structured token sequence having a time order of situations represented by timestamps associated with image frames in the input video data, and wherein each situation represented in the generated token sequence corresponds to a corresponding situation graph segment and a corresponding action hyperedge segment, wherein a situation graph data structure segment comprises a set of interaction tuples with atomic tokens, and wherein each action hyperedge segment represents an action type.

17. The method of claim 1, wherein each token in the generated token sequence comprises a token embedding that encodes appearance representations for objects, pose representations for humans, or distributed embeddings for action, relationship categories of a corresponding situation of the input video data, a type embedding that encodes token types, a hyperedge embedding that indicates hyperedge positions within the corresponding situation, a situation embedding that records a situation time order of the corresponding situation, and a segment embedding.

18. The method of claim 3, wherein different pluralities of program modules are selected from the set of predefined program modules for different input natural language questions based on the particular terms or phrases present in the different input natural language questions.

* * * * *